US007779131B2

(12) United States Patent
Nishida et al.

(10) Patent No.: US 7,779,131 B2
(45) Date of Patent: Aug. 17, 2010

(54) SERVER AND COMMUNICATION CONTROL METHOD

(75) Inventors: Minoru Nishida, Yokohama (JP); Kousei Kataoka, Yokohama (JP); Yuichi Haraguchi, Yokohama (JP); Tomoyuki Furutono, Yokohama (JP); Takaaki Taura, Yokohama (JP); Takayuki Uchihira, Yokohama (JP); Ryoji Nakamatsu, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 1538 days.

(21) Appl. No.: 11/096,955

(22) Filed: Apr. 1, 2005

(65) Prior Publication Data

US 2006/0165062 A1    Jul. 27, 2006

(30) Foreign Application Priority Data

Nov. 18, 2004    (JP)    ............................. 2004-334304

(51) Int. Cl.
*G06F 15/16* (2006.01)
*H04M 11/00* (2006.01)

(52) U.S. Cl. ...................... 709/227; 709/230; 379/93.31

(58) Field of Classification Search ................. 709/227, 709/228, 230; 379/93.09, 93.31
See application file for complete search history.

(56) References Cited

U.S. PATENT DOCUMENTS 6,118,784 A * 9/2000 Tsuchiya et al. ............ 370/401

| | | | |
|---|---|---|---|
| 7,474,675 B2 * | 1/2009 | Park et al. ................... 370/469 |
| 2004/0141513 A1 * | 7/2004 | Takechi et al. .............. 370/401 |
| 2005/0066038 A1 * | 3/2005 | Sakamoto et al. ........... 709/227 |

FOREIGN PATENT DOCUMENTS

| JP | 2003-152820 | 5/2003 |
|---|---|---|
| JP | 2004-260314 | 9/2004 |
| WO | WO 2004057831 A1 * | 7/2004 |

OTHER PUBLICATIONS

Japanese Office Action dated Oct. 20, 2009, with partial translation, from the corresponding Japanese Application.

* cited by examiner

*Primary Examiner*—Larry Donaghue
*Assistant Examiner*—Brian J Gillis
(74) *Attorney, Agent, or Firm*—Katten Muchin Rosenman LLP

(57) ABSTRACT

An IP version storage section included in the server stores an IP version implemented in the destination terminal under the control of the server. A message receiving section receives a message from the source terminal. An IP version acquisition section acquires the IP version implemented in the destination terminal corresponding to the message from the IP version storage section. An IP version comparison section compares an IP version which is implemented in the source terminal and which is included in the message with the IP version which is implemented in the destination terminal and which is acquired by the IP version acquisition section. A comparison result sending section sends a result of the comparison by the IP version comparison section to an address converter which makes an address conversion so that IP versions of data frames exchanged between the source terminal and the destination terminal will match.

8 Claims, 31 Drawing Sheets

28 IP VERSION CONVERSION TABLE

| IPV4 TERMINAL ADDRESS | INTRA-CONVERTER IPV4 ADDRESS | INTRA-CONVERTER IPV6 ADDRESS | IPV6 TERMINAL ADDRESS |
|---|---|---|---|
| 192.168.0.1 | 10.11.12.13 | FF1E:03AD::7F2E:172A:1E24 | FE1C:568C::65D8:1963:2A4C |
| 192.168.1.1 | 10.11.12.18 | FF1E:03AD::7F2E:172A:1E25 | FE3E:0C2D::2E15:65A8:18B9 |
| 192.168.2.17 | 10.11.12.20 | FF1E:03AD::7F2E:172A:1E26 | FC1E:B02C::541F:125D:1932 |
| ... | ... | ... | ... |

FIG. 9

```
INVITE sip:UserJ@east.net   SIP/2.0
 Via: SIP/2.0/UDP west.net:5060;branch=z9hG4bK776as3
Max-Forwards: 70
From: Ken < sip:UserD@west.net >;tag=r18f061962
To: Maki < sip:UserJ@east.net >
Call-ID: 30017891@west.net
CSeq : 1 INVITE
Contact: <sip:UserD@192.168.0.1>
Content-Type: application/ sdp
Content-Length: 138
```
} 101

```
v=0
o=UserD 2890842807  2890842807  IN IP4 west.net
s=Voice Session
c=IN  IP4 192.168.0.1
t=0 0
m=audio 50000 RTP/AVP 0
a=rtpmap:0 PCMU/8000
```
} 102

FIG. 16

23d IP VERSION TABLE

| Call-ID | IP VERSION |
|---|---|
| 30017891@west.net | IPv4 |
| 43215782@east.net | IPv6 |
| ⋮ | ⋮ |

FIG. 17

```
REGISTER sip:rs1.east.net SIP/2.0
Via: SIP/2.0/UDP east.net:5060;branch=z9hG4bK776as3
Max-Forwards: 70
From: Maki < sip:UserJ@east.net >        103
To: Maki < sip:UserJ@east.net >
Call-ID: 30017891@east.net
CSeq : 417 REGISTER                           104
 Contact: <sip:UserJ@FE1C:568C::65D8:1963:2A4C>
Expires: 7200
Content-Length: 0
```

FIG. 18

16 SUBSCRIBER MANAGEMENT TABLE

| USER NAME | IP VERSION | IP ADDRESS |
|---|---|---|
| UserJ@east.net | IPv6 | FE1C:568C::65D8:1963:2A4C |
| UserB@east.net | IPv4 | ⋮ |
| ⋮ | ⋮ | ⋮ |

FIG. 19

```
SIP/2.0 200 OK
Via: SIP/2.0/UDP west.net:5060;branch=z9hG4bK776as3
From: Ken < sip:UserD@west.net >;tag=r18f061962
To: Maki < sip:UserJ@east.net >;tag=c381006
Call-ID: 30017891@west.net
CSeq : 1 INVITE
Contact: <sip:UserJ@FF1C:568C::65D8:1963:2A4C>
Content-Type: application/ sdp
Content-Length: 138 v=0
o=UserJ 2890842807 2890842807 IN IP6 east.net
s=Voice Session
c=IN IP6 FF1C:568C::65D8:1963:2A4C        } 105
t=0 0
m=audio 50000 RTP/AVP 0
a=rtpmap:0 PCMU/8000
```

FIG. 20

INVITE sip:UserJ@east.net   SIP/2.0
Via: SIP/2.0/UDP west.net:5060;branch=z9hG4bK776as3
Max-Forwards: 70
From: Ken < sip:UserD@west.net >;tag=r18f061962
To: Maki < sip:UserJ@east.net >
Call-ID: 30017891@west.net
CSeq : 1 INVITE
Contact: <sip:UserD@10.11.12.13>
Content-Type: application/ sdp
Content-Length: 138 v=0
o=UserD 2890842807 2890842807 IN IP6 west.net
s=Voice Session
c=IN  IP6 FF1E:03AD::7F2E:172A:1E24
t=0 0
m=audio 50000 RTP/AVP 0
a=rtpmap:0 PCMU/8000

```
SIP/2.0 200 OK
Via: SIP/2.0/UDP west.net:5060;branch=z9hG4bK776as3
From: Ken < sip:UserD@west.net >;tag=r18f061962
To: Maki < sip:UserJ@east.net >;tag=c381006
Call-ID: 30017891@west.net
CSeq: 1 INVITE
Contact: <sip:UserJ@10.11.12.13>
Content-Type: application/ sdp
Content-Length: 138 v=0
o=UserJ 2890842807 2890842807 IN IP4 east.net
s=Voice Session
c=IN IP4 10.11.12.13
t=0 0
m=audio 50000 RTP/AVP 0
a=rtpmap:0 PCMU/8000
```
} 107

FIG. 22

SIP/2.0 399 IP Kind Unmatched ⌐ 108
Via: SIP/2.0/UDP west.net:5060;branch=z9hG4bKbf9f44
    ;received=FF1C:568C::65D8:1963:2A4C
From: Ken < sip:UserD@west.net >;tag=r18f061962
To: Maki < sip:UserJ@east.net >;tag=c381006
Call-ID: 30017891@west.net
CSeq: 1 Ack
Content-Length: 138

FIG. 28

SERVER AND COMMUNICATION CONTROL METHOD

CROSS-REFERENCE TO RELATED APPLICATIONS

This application is based upon and claims the benefits of priority from the prior Japanese Patent Application No. 2004-334304, filed on Nov. 18, 2004, the entire contents of which are incorporated herein by reference.

BACKGROUND OF THE INVENTION (1) Field of the Invention

This invention relates to a server and a communication control method and, more particularly, to a server connected to an IP network and a method for controlling communication by such a server.

(2) Description of the Related Art

IP networks on which call processing for integrating and transmitting voice and data can be performed have developed based on the Internet Protocol version 4 (IPv4). However, the problem of exhausting IP addresses has arisen as a result of the rapid development of IP networks. Accordingly, the use of IP networks based on the Internet Protocol version 6 (IPv6) by which an almost limitless number of addresses can be allocated is spreading. This means that terminals in which IPv4 is implemented coexist with terminals in which IPv6 is implemented for a certain period of time.

Communication cannot be performed between terminals in which different IP versions are implemented. Conventionally, session initiation protocol (SIP) servers for converting the IP versions of frames have been installed on IP networks.

FIG. 29 shows an example of the configuration of a conventional SIP server system. As shown in FIG. 29, servers 201 through 203, being SIP servers, and routers 221 and 222 are installed on an IP network. Terminal 211 and 212, such as IP telephones, are connected to the IP network. The server 201 has an IP version conversion table 201a for converting the IP version of a frame so that frames (voice data) can be exchanged between IP telephones in which different IP versions are implemented. It is assumed that an IP version implemented in the terminal 211 is IPv4 and that an IP version implemented in the terminal 212 is IPv6.

FIG. 30 is a sequence diagram of the system shown in FIG. 29. In FIG. 30, 180Ringing messages and Ack messages are not shown.

The terminals 211 and 212 shown in FIG. 29 must establish an SIP session in order to communicate with each other (in order to establish a real-time transport protocol (RTP) session). As shown in FIG. 30, in step S201, the terminal 211 sends an INVITE message to the server 202. The INVITE message includes information which indicates that IPv4 is implemented in the terminal 211.

In step S202, the server 202 sends the INVITE message it received from the terminal 211 to the server 201.

In step S203, the server 201 sends the INVITE message it received from the server 202 to the server 203.

In step S204, the server 203 sends the INVITE message it received from the server 201 to the terminal 212.

In step S205, the terminal 212 compares the IP version which is implemented in the terminal 211 and which is included in the INVITE message it received with the IP version implemented in the terminal 212 and sends the result of the comparison to the server 203. The IP version implemented in the terminal 211 is IPv4 and the IP version implemented in the terminal 212 is IPv6. Therefore, the terminal 212 informs the server 203 that the IP versions implemented in the terminals 211 and 212 do not match.

In step S206, the server 203 informs the server 201 that the IP versions implemented in the terminals 211 and 212 do not match.

In step S207, the server 201 is informed that the IP versions implemented in the terminals 211 and 212 do not match, and generates an IP version conversion table 201a so that the terminals 211 and 212 can communicate with each other via a media stream based on RTP.

In step S208, the server 201 sends the server 203 an INVITE massage including an IPv6 address corresponding to the terminal 211 generated in step S207.

In step S209, the server 203 sends the terminal 212 the INVITE massage it received from the server 201.

In step S210, the terminal 212 sends a 200OK message to the server 203 because the IP version included in the INVITE massage it received from the server 203 matches the IP version implemented in it.

In step S211, the server 203 sends the 200OK message to the server 201.

In step S212, the server 201 sends the server 202 the 200OK message including an IPv4 address corresponding to the terminal 212 generated in step S207.

In step S213, the server 202 sends the 200OK message to the terminal 211.

As a result, an IPv4 RTP session is established between the terminal 211 and the server 201 and an IPv6 RTP session is established between the terminal 212 and the server 201. Accordingly, the terminals 211 and 212 can communicate with each other via the IP version conversion table 201a.

The case where a call is made from the terminal 211 (source terminal) in which IPv4 is implemented to the terminal 212 (destination terminal) in which IPv6 is implemented has been described. By following the same procedure, a call can be made from the terminal 212 (source terminal) in which IPv6 is implemented to the terminal 211 (destination terminal) in which IPv4 is implemented.

FIG. 31 is another sequence diagram of the system shown in FIG. 29. In this example, it is assumed that the terminal 212 does not have the function of comparing IP versions. Accordingly, the server 203 times out when the result of a comparison between IP versions and a 200OK message are not sent from the terminal 212. Then the server 203 informs the server 201 that the server 203 timed out.

Steps S221 through S224 are the same as steps S201 through S204, respectively, shown in FIG. 30 and descriptions of them will be omitted.

In step S225, the server 203 times out when the result of a comparison between IP versions and a 200OK message are not sent from the terminal 212. Then the server 203 informs the server 201 that the server 203 timed out.

In step S226, the server 201 is informed by the server 203 that the server 203 timed out, and generates an IP version conversion table 201a.

Steps S227 through S232 are the same as steps S208 through S213, respectively, shown in FIG. 30 and descriptions of them will be omitted.

As stated above, the server 203 times out and the server 201 generates the IP version conversion table 201a. By doing so, the terminals 211 and 212 can communicate with each other.

A signaling relay system and a signaling relay method capable of establishing a session between terminals in which different IP versions are implemented for performing communication are proposed (see, for example, Japanese Patent Laid-Open Publication No. 2003-152820, paragraphs [0039]-[0040] and FIG. 4). With the signaling relay system and the signaling relay method, communication can be performed between two terminals if an IP version implemented in the other terminal is determined uniquely.

However, if a destination terminal determines whether an IP version implemented in a source terminal matches an IP version implemented in the destination terminal, then messages must be exchanged between the destination terminal and a server. As a result, it is time-consuming to establish a session.

If a destination terminal does not determine whether an IP version implemented in a source terminal matches an IP version implemented in the destination terminal, then a server must detect a time-out. As a result, it is time-consuming to establish a session.

In addition, if a destination terminal determines whether an IP version implemented in a source terminal matches an IP version implemented in the destination terminal, then the destination terminal must have the function of doing so. As a result, the manufacturing costs of destination terminals will rise.

SUMMARY OF THE INVENTION

The present invention was made under the background circumstances described above. An object of the present invention is to provide a server and a communication control method by which time taken to establish a session is shortened as a result of a reduction in the number of messages exchanged between a destination terminal and a server and which enable a reduction in the manufacturing costs of terminals.

In order to achieve the above object, a server connected to an IP network is provided. This server comprises an IP version storage section which stores an IP version implemented in a destination terminal under the control of the server, a message receiving section for receiving a message for establishing a session between a source terminal and the destination terminal from the source terminal, an IP version acquisition section for acquiring the IP version implemented in the destination terminal corresponding to the message from the IP version storage section, an IP version comparison section for comparing an IP version which is implemented in the source terminal and which is included in the message with the IP version which is implemented in the destination terminal and which is acquired by the IP version acquisition section, and a comparison result sending section for sending the result of the comparison by the IP version comparison section to an address converter which makes an address conversion so that IP versions of data frames exchanged between the source terminal and the destination terminal will match.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 9 shows an example of the data structure of the IP version conversion table.

FIG. 16 shows an INVITE message.

FIG. 17 shows an example of the data structure of an IP version table.

FIG. 18 shows a REGISTER message.

FIG. 19 shows an example of the data structure of a subscriber management table.

FIG. 20 shows a 200OK message sent from a SIP server which controls a terminal to a SIP server which makes an IP version conversion.

FIG. 21 shows an INVITE message sent again.

FIG. 22 shows a 200OK message in which an IP version and an IP address have been changed.

FIG. 28 shows an example of an IP version conversion message.

DESCRIPTION OF THE PREFERRED EMBODIMENTS

The principles underlying the present invention will now be described in detail with reference to the drawings.

Figure 1:
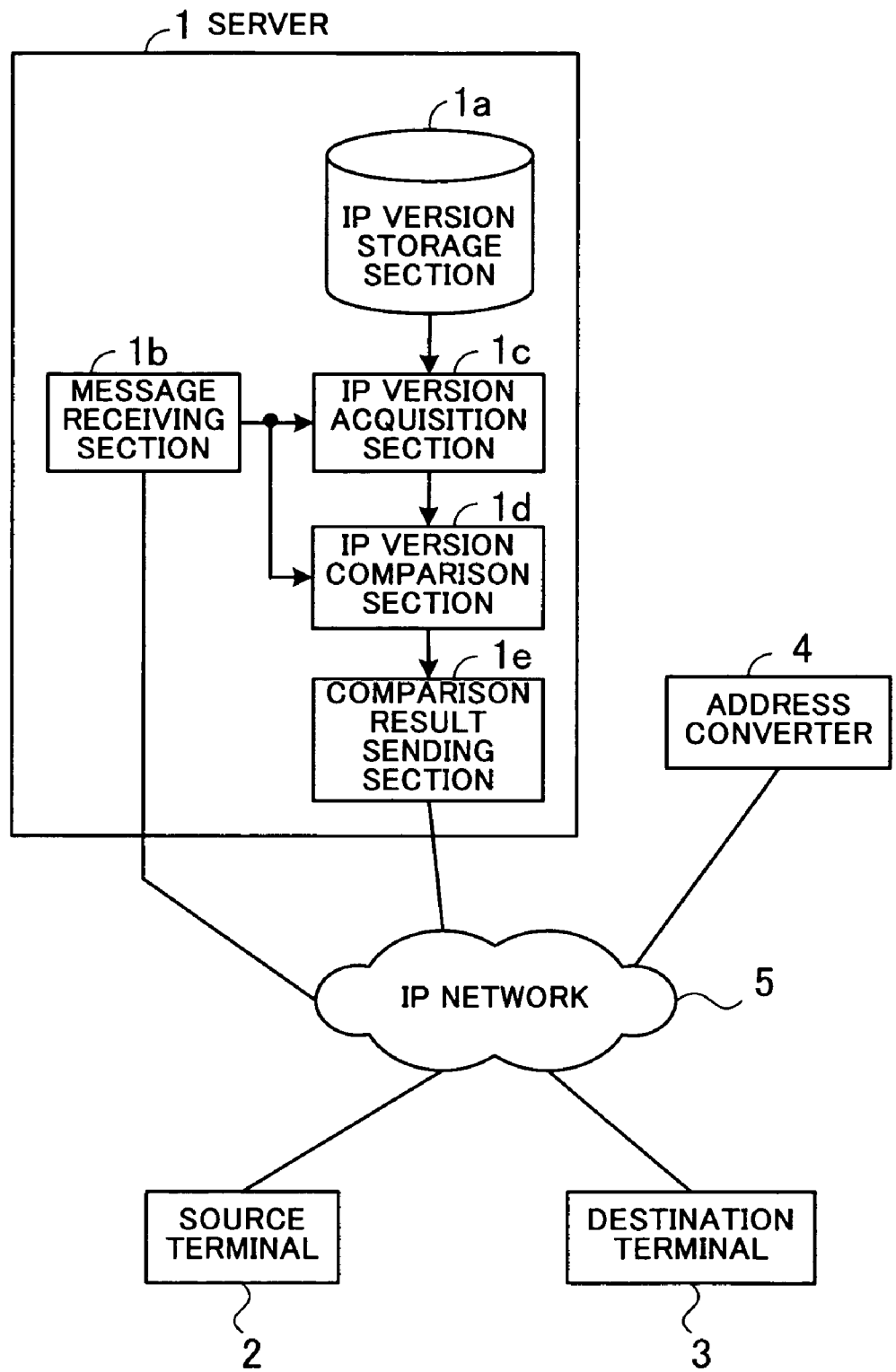
FIG. 1 is a schematic view of a server.

FIG. 1 is a schematic view of a server. As shown in FIG. 1, a server 1, a source terminal 2, a destination terminal 3, and an address converter 4 are connected to an IP network 5. The server 1 includes an IP version storage section 1*a*, a message receiving section 1*b*, an IP version acquisition section 1*c*, an IP version comparison section 1*d*, and a comparison result sending section 1*e*.

The IP version storage section 1*a* stores an IP version implemented in the destination terminal 3 under the control of the server 1. Only one destination terminal 3 is shown in FIG. 1, but in reality there are a plurality of destination terminals 3. The IP version storage section 1*a* stores IP versions implemented in these destination terminals 3. The message receiving section 1*b* receives a message for establishing a session between the source terminal 2 and the destination terminal 3 from the source terminal 2. Only one source terminal 2 is shown in FIG. 1, but in reality there are a plurality of source terminals 2. The IP version acquisition section 1*c* acquires an IP version implemented in the destination terminal 3 corresponding to the message received by the message receiving section 1*b* from the IP version storage section 1*a*. The IP version comparison section 1*d* compares an IP version which is implemented in the source terminal 2 and which is included in the message received by the message receiving section 1*b* with the IP version which is implemented in the destination terminal 3 and which is acquired by the IP version acquisition section 1*c*. The comparison result sending section 1*e* sends the result of the comparison by the IP version comparison section 1*d* to an address converter 4 for making an address conversion so that the IP versions of data frames exchanged between the source terminal 2 and the destination terminal 3 will match.

Operation performed in FIG. 1 will now be described. To exchange data frames with the destination terminal 3, the source terminal 2 sends the destination terminal 3 a message for establishing a session. The message receiving section 1*b* included in the server 1 receives the message. The IP version acquisition section 1*c* acquires an IP version implemented in the destination terminal 3 corresponding to the received message from the IP version storage section 1*a*. The IP version comparison section 1*d* compares an IP version which is implemented in the source terminal 2 and which is included in the received message with the IP version which is implemented in the destination terminal 3 and which is acquired from the IP version storage section 1*a*. The result of the comparison is sent to the address converter 4.

The address converter 4 makes an address conversion according to the result of the comparison so that the IP versions of data frames exchanged between the source terminal 2 and the destination terminal 3 will match. Therefore, even if the IP versions implemented in the source terminal 2 and the destination terminal 3 differ, a data frame is properly sent from the source terminal 2 to the destination terminal 3 because the IP version of an address is converted by the address converter 4. Similarly, a data frame is properly sent from the destination terminal 3 to the source terminal 2 because the IP version of an address is converted by the address converter 4.

As stated above, the server 1 compares the IP version implemented in the source terminal 2 with the IP version implemented in the destination terminal 3 and sends the result of the comparison to the address converter 4 which makes an address conversion so that the IP versions of data frames exchanged between the source terminal 2 and the destination terminal 3 will match. As a result, there is no need for the destination terminal 3 to determine whether the IP version implemented in the source terminal 2 matches the IP version implemented in the destination terminal 3. This reduces the number of messages exchanged between the destination terminal 3 and the server 1. Accordingly, time taken to establish a session can be shortened and the manufacturing costs of the source terminal 2 and the destination terminal 3 can be reduced.

A first embodiment of the present invention will now be described in detail with reference to the drawings.

Figure 2:
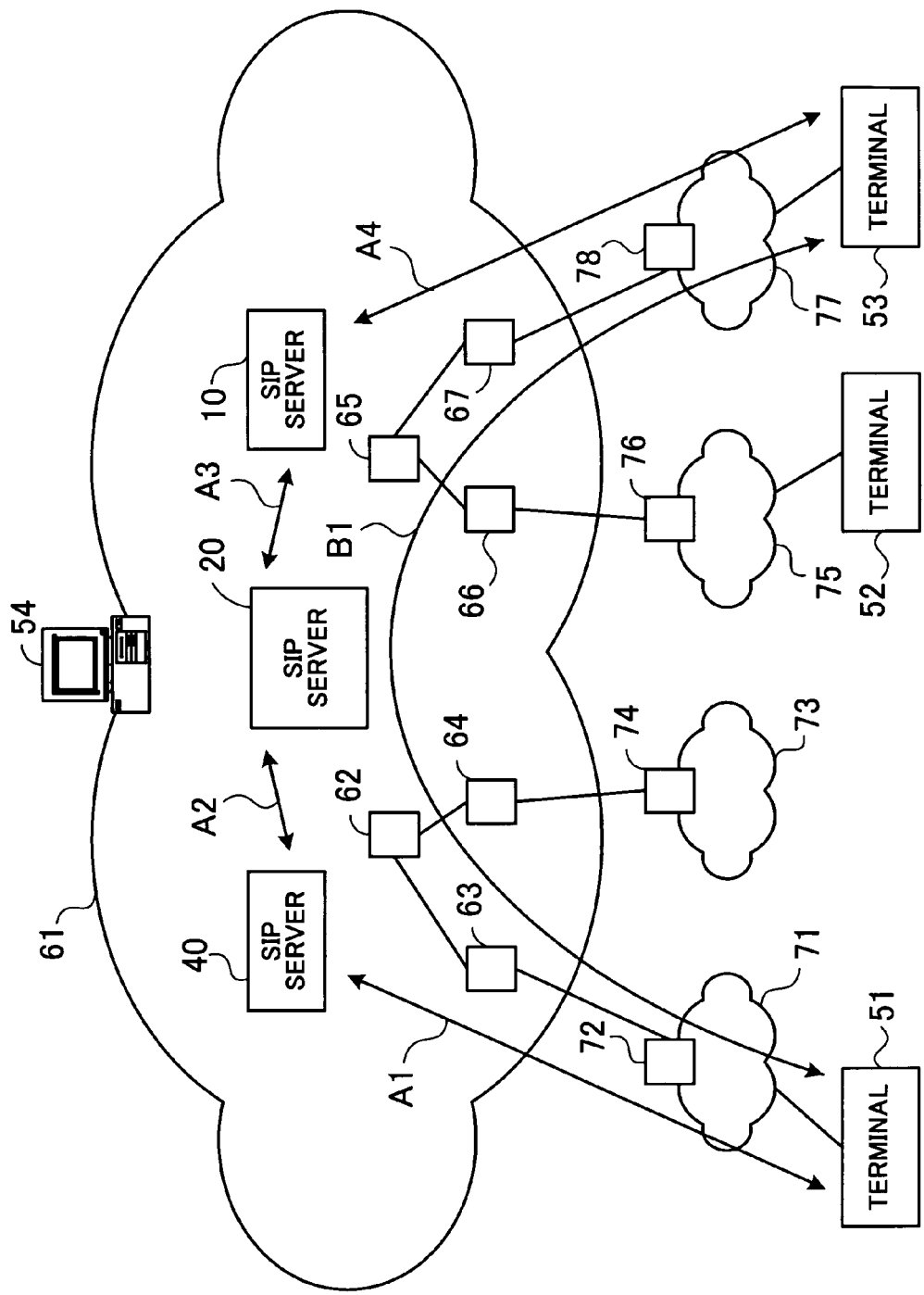
FIG. 2 is a schematic view showing an example of the configuration of a SIP server system according to a first embodiment of the present invention.

FIG. 2 is a schematic view showing an example of the configuration of a SIP server system according to a first embodiment of the present invention. Both IPv4 and IPv6 are implemented on an IP network 61 shown in FIG. 2. SIP servers 10, 20, and 40, core routers 62 and 65, and edge routers 63, 64, 66, and 67 are installed on the IP network 61. An IP network 71 is connected to the edge router 63 on the IP network 61 via an area router 72. An IP network 73 is connected to the edge router 64 on the IP network 61 via an area router 74. An IP network 75 is connected to the edge router 66 on the IP network 61 via an area router 76. An IP network 77 is connected to the edge router 67 on the IP network 61 via an area router 78.

A terminal 51 is connected to the IP network 71. A terminal 52 is connected to the IP network 75. A terminal 53 is connected to the IP network 77. A terminal 54 is connected to the IP network 61. The terminals 51 through 53 are, for example, IP telephones and can send and receive voice data or image data via the IP networks 61, 71, 75, and 77. The terminal 54 communicates with the SIP server 10, 20, or 40 and makes its IP version conversion function valid or invalid.

The SIP servers 10, 20, and 40 establish a SIP session between the terminals 51 through 53. Data (frames) can be exchanged between the terminals 51 through 53 when the SIP servers 10, 20, and 40 establish a SIP session.

Frames cannot be exchanged between the terminals 51 through 53 in which different IP versions are implemented. Accordingly, the SIP server 20 generates an IP version conversion table used for converting the IP version of a frame. Address conversions are performed on frames which are exchanged between the terminals 51 through 53 and the IP versions of which are different on the basis of the IP version conversion table. By doing so, these frames can be exchanged between the terminals 51 through 53.

It is assumed that IPv4 is implemented in the terminal 51, that IPv6 is implemented in the terminal 53, and that a call is made from the terminal 51 to the terminal 53. As shown by double-headed arrows A1 through A4 in FIG. 2, the terminal 51 sends the terminal 53 an INVITE message to establish a SIP session between the terminals 51 and 53. Information which indicates that IPv4 is implemented in the terminal 51 is included in the INVITE message.

The INVITE message is sent from the terminal 51 to the SIP server 20 via the SIP server 40 which controls the terminal 51. Then the INVITE message is sent to the SIP server 10 which controls the terminal 53. The SIP server 10 which controls the terminal 53 recognizes that IPv6 is implemented in the terminal 53. The SIP server 10 compares the IP version which is implemented in the terminal 51 and which is included in the received INVITE message with the IP version implemented in the terminal 53, determines whether it is necessary to make an IP version conversion, and sends the SIP server 20 the result of the determination. IPv4 is implemented in the terminal 51 and IPv6 is implemented in the terminal 53. Therefore, the SIP server 10 informs the SIP server 20 that these IP versions do not match.

When the SIP server 10 informs the SIP server 20 that these IP versions do not match, the SIP server 20 generates an IP version conversion table so that frames can be exchanged between the terminals 51 and 53. As a result, for example, an RTP/RTCP (RTP control protocol) media stream shown by a double-headed arrow B1 in FIG. 2 is formed and frames can be exchanged between the terminals 51 and 53.

As stated above, the SIP server 10 which controls the destination terminal (terminal 53) determines whether it is necessary to make an IP version conversion. As a result, the number of messages exchanged between the SIP server 10 and the terminal 53 can be reduced and time taken to establish a SIP session can be shortened. In addition, there is no need for the terminal 53 to have the function of determining whether the IP version implemented in the terminal 51 matches the IP version implemented in the terminal 53. This reduces the manufacturing costs of terminals.

The SIP server 40 has the same function as the SIP server 10. When the terminal 53 is a source terminal and the terminal 51 is a destination terminal, the SIP server 40 determines whether it is necessary to make an IP version conversion, and sends the SIP server 20 the result of the determination. The SIP server 20 receives the result of the determination from the SIP server 40 and generates an IP version conversion table so that frames can be exchanged between the terminals 53 and 51.

The hardware configuration of the SIP server 10 will now be described.

Figure 3:
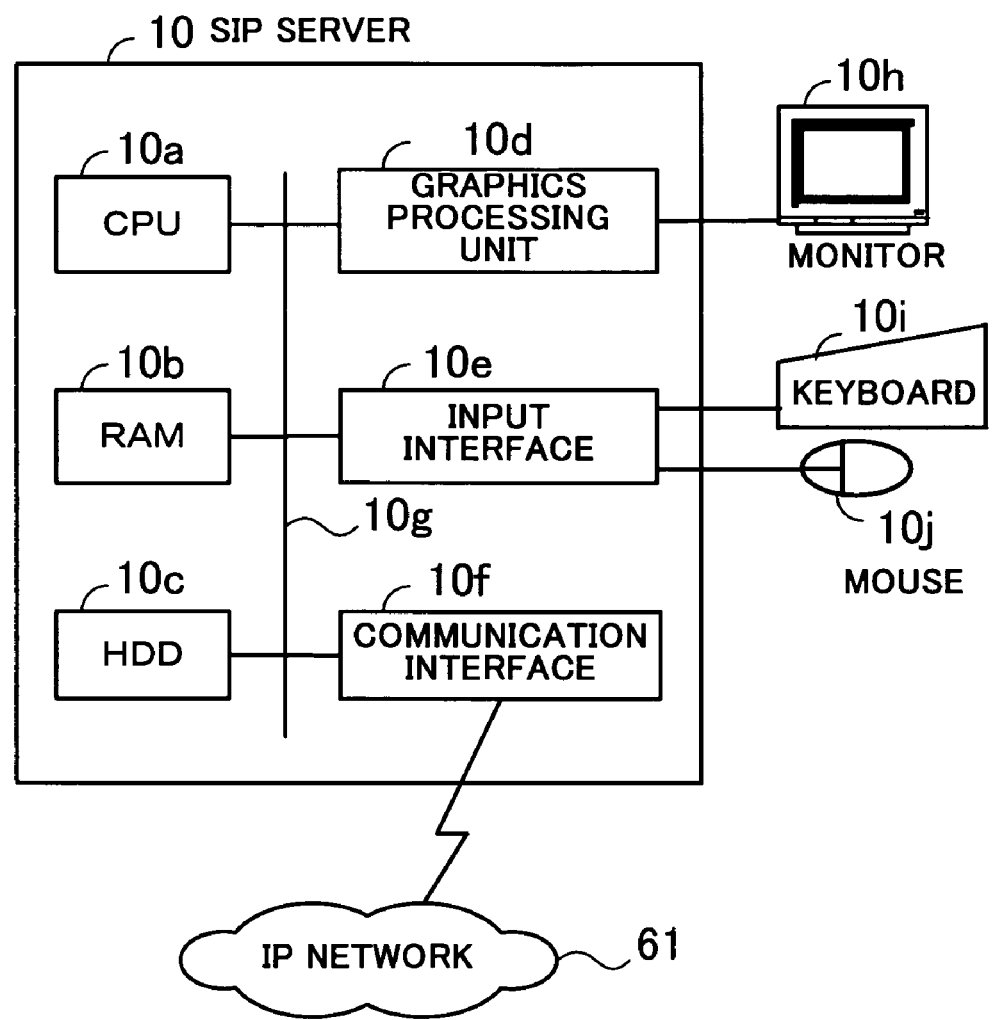
FIG. 3 shows an example of the hardware configuration of the SIP server.

FIG. 3 shows an example of the hardware configuration of the SIP server. As shown in FIG. 3, the whole of the SIP server 10 is controlled by a central processing unit (CPU) 10a. A random access memory (RAM) 10b, a hard disk drive (HDD) 10c, a graphics processing unit 10d, an input interface 10e, and a communication interface 10f are connected to the CPU 10a via a bus 10g. The RAM 10b temporarily stores at least part of an operating system (OS) or an application program for establishing a SIP session and converting an IP version which is executed by the CPU 10a. The RAM 10b also stores various pieces of data which the CPU 10a needs to perform a process. The HDD 10c stores the OS, application programs, various pieces of data, and the like.

A monitor 10h is connected to the graphics processing unit 10d. In accordance with instructions from the CPU 10a, the graphics processing unit 10d displays an image on a display screen of the monitor 10h. A keyboard 10i and a mouse 10j are connected to the input interface 10e. The input interface 10e sends a signal sent from the keyboard 10i or the mouse 10j to the CPU 10a via the bus 10g.

In accordance with instructions from the CPU 10a, the communication interface 10f communicates with the other SIP servers 20 and 40 and the terminals 51 through 53 via the IP network 61.

By adopting the above-mentioned hardware configuration, the processing function of this embodiment can be realized. The hardware configuration of the SIP servers 20 and 40 and the terminals 51 through 53 is the same as that shown in FIG. 3.

The function of the SIP server 10 will now be described.

Figure 4:
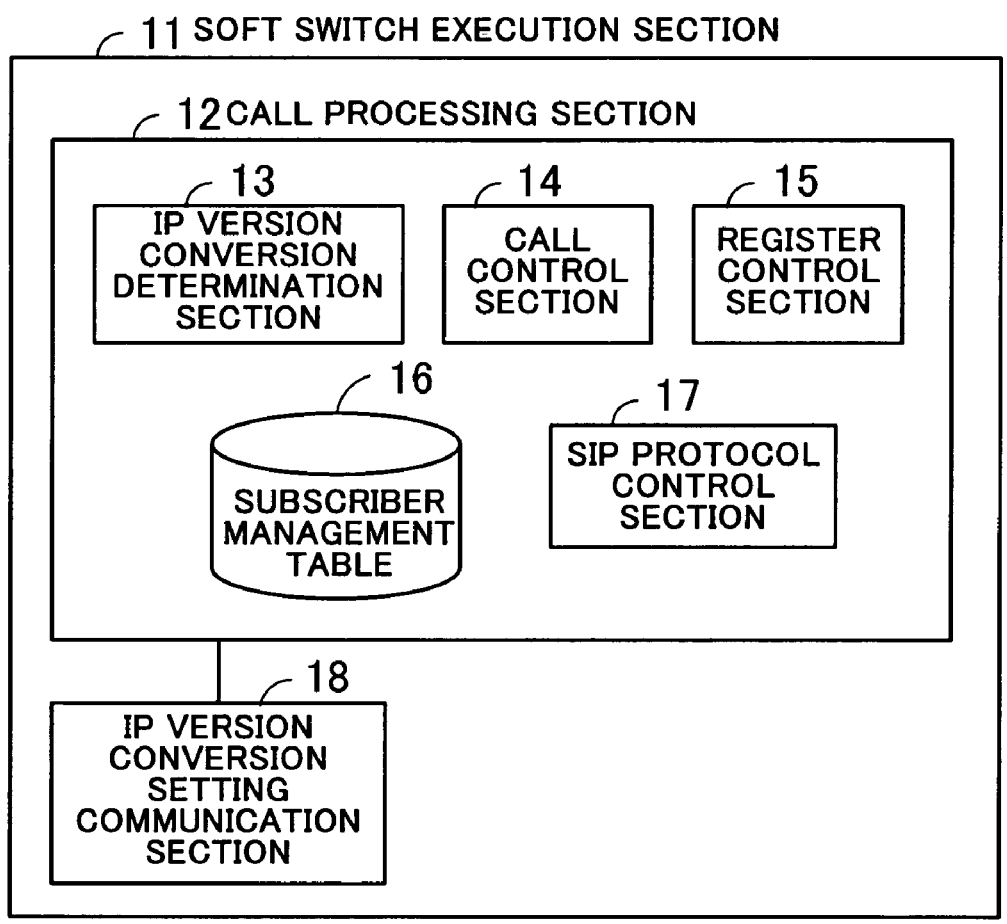
FIG. 4 is a functional block diagram of a SIP server.

FIG. 4 is a functional block diagram of the SIP server. As shown in FIG. 4, the SIP server 10 includes a soft switch execution section 11. The soft switch execution section 11 interprets a SIP protocol and establishes or releases a SIP session. In addition, the soft switch execution section 11 compares an IP version implemented in a destination terminal under the control of the SIP server 10 with an IP version which is implemented in a source terminal and which is included in an INVITE message sent from the source terminal, and determines whether it is necessary to convert the IP versions of frames exchanged between the source terminal and the destination terminal. Then the soft switch execution section 11 sends a determination result to the SIP server 20. To perform the above-mentioned function, the soft switch execution section 11 includes a call processing section 12 and an IP version conversion setting communication section 18.

The call processing section 12 processes the call on the basis of a SIP protocol. Moreover, the call processing section 12 determines whether the IP version implemented in the source terminal is different from the IP version implemented in the destination terminal, and send a determination result to the SIP server 20. The IP version conversion setting communication section 18 communicates with the terminal 54 connected to the IP network 61. The IP version conversion setting communication section 18 receives from the terminal 54 instructions to make the IP version conversion function valid or invalid.

To perform the above-mentioned function, the call processing section 12 includes an IP version conversion determination section 13, a call control section 14, a register control section 15, a subscriber management table 16, and a SIP protocol control section 17. The IP version conversion determination section 13 determines whether the IP version implemented in the source terminal is different from the IP version implemented in the destination terminal.

Figure 5:
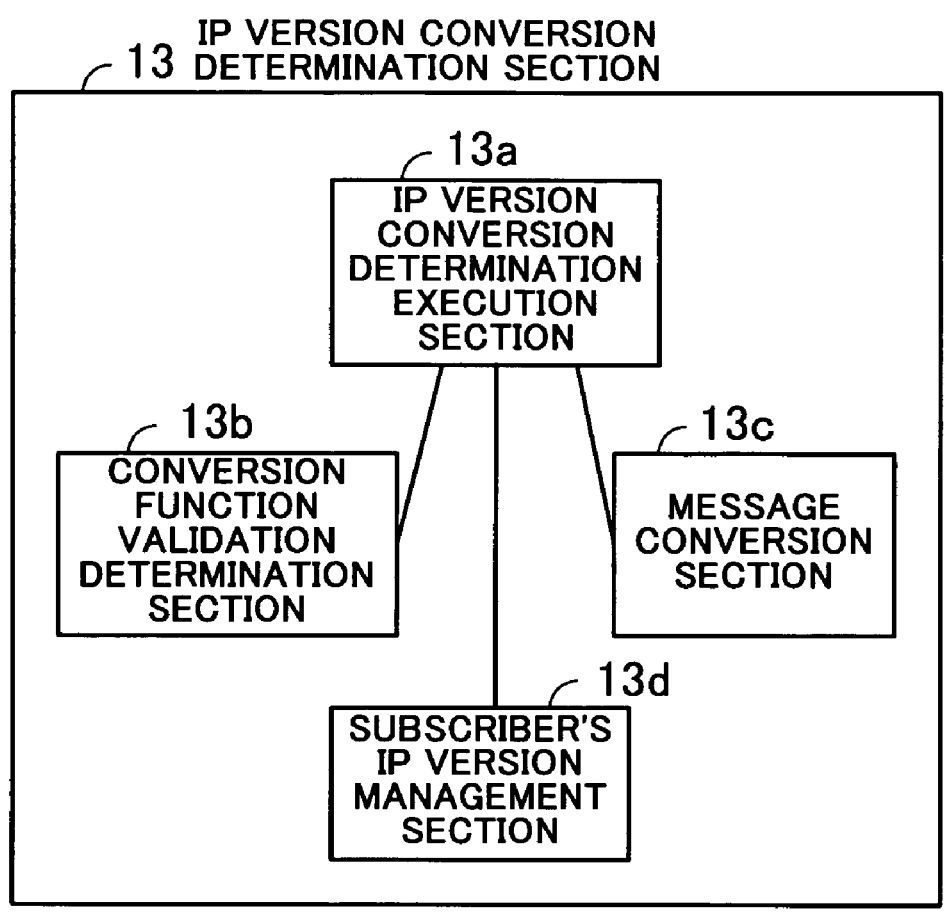
FIG. 5 is a functional block diagram showing the details of an IP version conversion determination section.

FIG. 5 is a functional block diagram showing the details of the IP version conversion determination section. As shown in FIG. 5, the IP version conversion determination section 13 includes an IP version conversion determination execution section 13a, a conversion function validation determination section 13b, a message conversion section 13c, and a subscriber's IP version management section 13d.

The IP version conversion determination execution section 13a compares the IP version which is implemented in the source terminal and which is included in the INVITE message sent from the source terminal with the IP version which is implemented in the destination terminal under the control of the SIP server 10 and which is stored in the subscriber management table 16, and determines whether it is necessary to make an IP version conversion. If it is necessary to make an IP version conversion, the IP version conversion determination execution section 13a requests the message conversion section 13c to generate a response message, such as a 200OK message, including a determination result. In addition, the IP version conversion determination execution section 13a refers to the conversion function validation determination section 13b and makes the IP version conversion function valid or invalid.

The conversion function validation determination section 13b holds the instructions to make the IP version conversion function valid or invalid received by the IP version conversion setting communication section 18 from the terminal 54.

If the IP version conversion determination execution section 13a determines that it is necessary to make an IP version conversion, the message conversion section 13c generates the response message to be sent to the SIP server 20. The response message is, for example, a 200OK message and includes a determination result to the effect that an IP version conversion is necessary.

The subscriber's IP version management section 13d refers to the subscriber management table 16 in which the IP version implemented in the destination terminal under the control of the SIP server 10 is stored, and acquires the IP version implemented in the destination terminal corresponding to the INVITE message sent from the source terminal.

To return to descriptions of the call processing section 12 shown in FIG. 4, the call control section 14 controls the call on the basis of the SIP protocol. The register control section 15 communicates with a terminal under the control of the SIP server 10 and acquires subscriber information including an IP version implemented in the terminal. The subscriber management table 16 stores the subscriber information acquired by the register control section 15. The subscriber management table 16 is built in a storage unit, such as the RAM 10*b* or the HDD 10*c* shown in FIG. 3. The SIP protocol control section 17 treats the SIP protocol. The function of the SIP server 40 is the same as that shown in FIG. 4 and descriptions of it will be omitted.

The function of the SIP server 20 will now be described.

Figure 6:
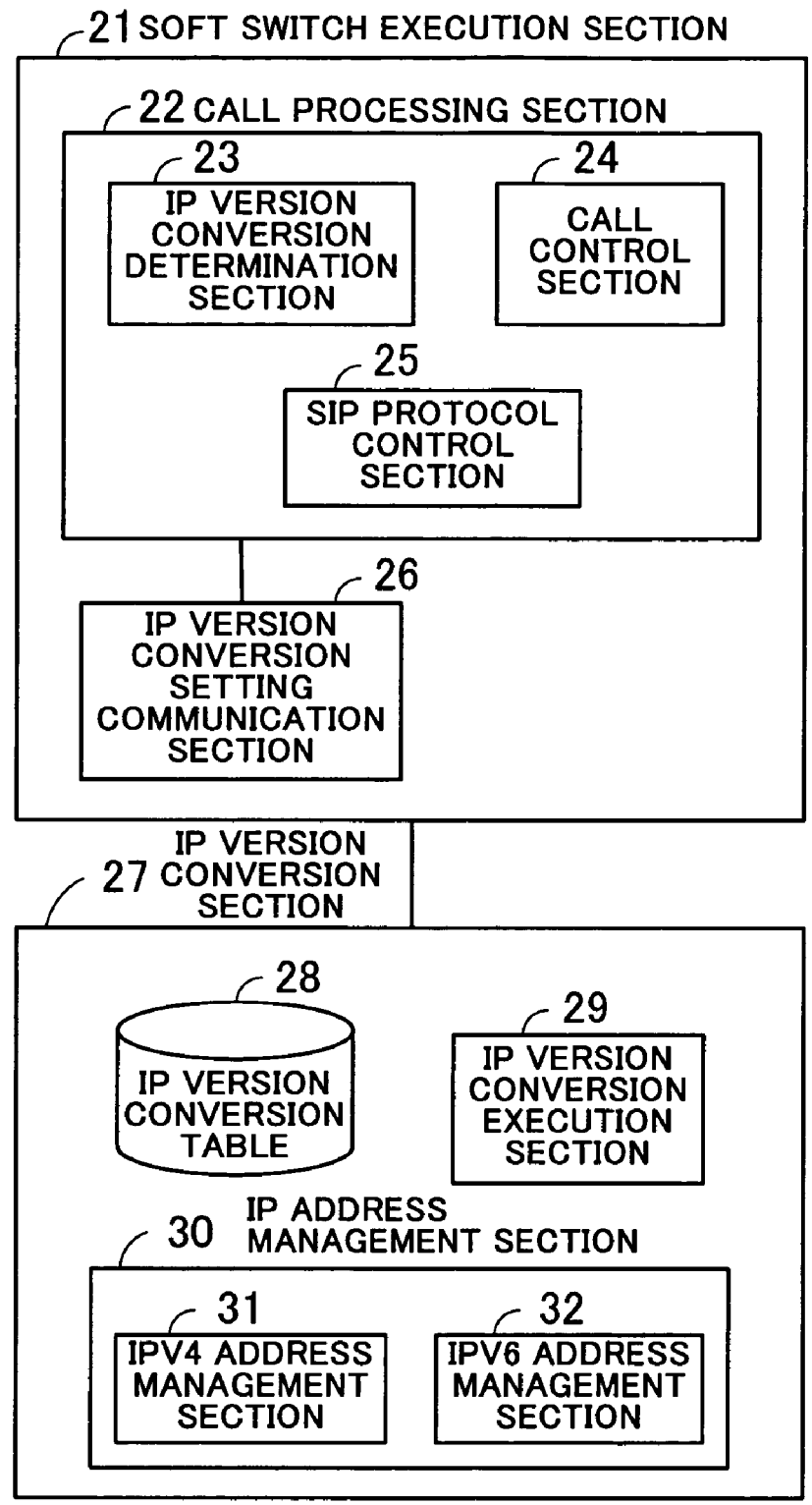
FIG. 6 is a functional block diagram of a SIP server which generates an IP version conversion table.

FIG. 6 is a functional block diagram of the SIP server which generates an IP version conversion table. As shown in FIG. 6, the SIP server 20 includes a soft switch execution section 21 and an IP version conversion section 27. The soft switch execution section 21 interprets the SIP protocol and establishes or releases a SIP session. In accordance with the response message from the SIP server 10 or 40, the soft switch execution section 21 controls the IP version conversion section 27 to make an IP version conversion. To perform the above-mentioned function, the soft switch execution section 21 includes a call processing section 22 and an IP version conversion setting communication section 26.

The call processing section 22 processes the call on the basis of the SIP protocol. Moreover, if the SIP server 10 or 40 determines that the IP version implemented in the source terminal is different from the IP version implemented in the destination terminal, the call processing section 22 controls the IP version conversion section 27 to make an IP version conversion. The IP version conversion setting communication section 26 communicates with the terminal 54 connected to the IP network 61. The IP version conversion setting communication section 26 receives from the terminal 54 instructions to make the IP version conversion function valid or invalid.

To perform the above-mentioned function, the call processing section 22 includes an IP version conversion determination section 23, a call control section 24, and a SIP protocol control section 25. If the SIP server 10 or 40 determines that the IP version implemented in the source terminal is different from the IP version implemented in the destination terminal, the IP version conversion determination section 23 controls the IP version conversion section 27 to make an IP version conversion.

Figure 7:
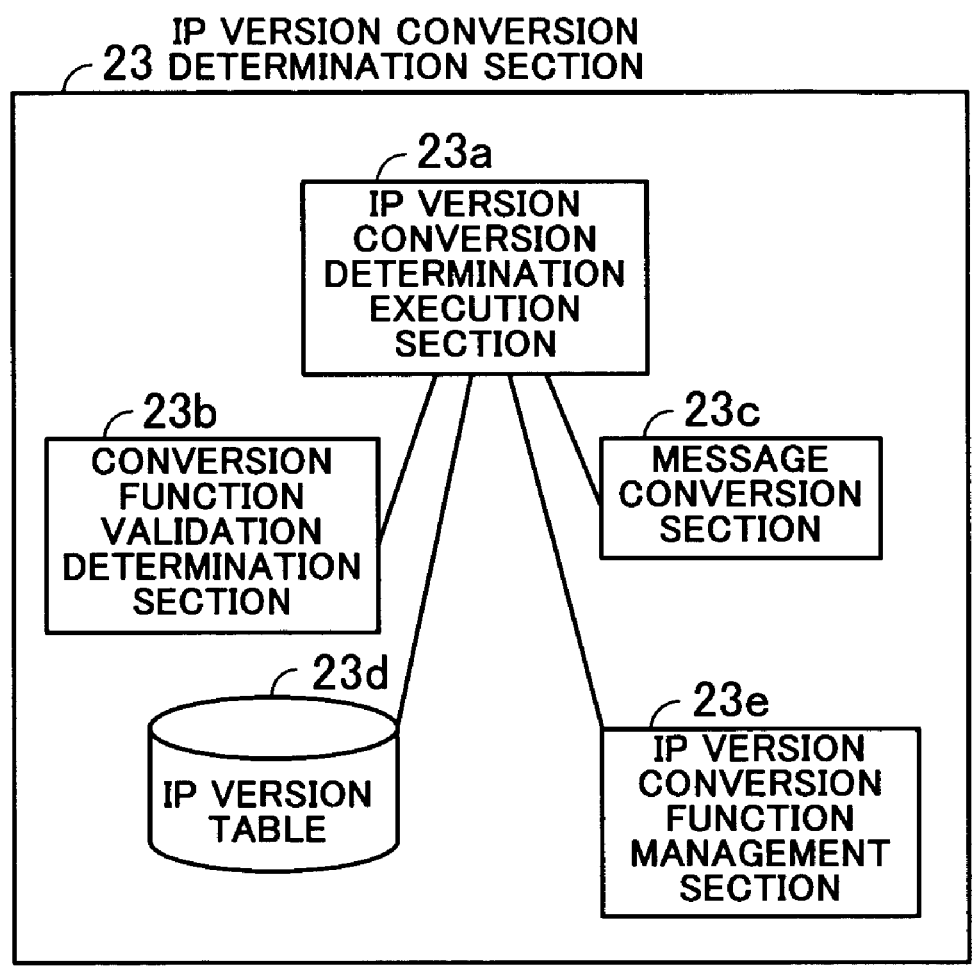
FIG. 7 is a functional block diagram showing the details of an IP version conversion determination section.

FIG. 7 is a functional block diagram showing the details of the IP version conversion determination section. As shown in FIG. 7, the IP version conversion determination section 23 includes an IP version conversion determination execution section 23*a*, a conversion function validation determination section 23*b*, a message conversion section 23*c*, an IP version table 23*d*, and an IP version conversion function management section 23*e*.

The IP version conversion determination execution section 23*a* interprets the response message, such as a 200OK message, returned from the SIP server 10 or 40 and determines whether it is necessary to make an IP version conversion. The IP version conversion determination execution section 23*a* compares the IP version which is implemented in the destination terminal and which is included in the received response message with the IP version which is implemented in the source terminal which called the destination terminal and which is stored in the IP version table 23*d*. If these IP versions differ, the IP version conversion determination execution section 23*a* determines that it is necessary to make an IP version conversion.

In addition, the IP version conversion determination execution section 23*a* makes a request to the IP version conversion function management section 23*e* so that the IP version conversion section 27 will generate and release an IP version conversion table 28 for making an IP version conversion. The IP version conversion determination execution section 23*a* also requests the message conversion section 23*c* to generate a message to be reissued to the destination terminal and a message necessary for the source terminal if it is necessary to make an IP version conversion. Moreover, the IP version conversion determination execution section 23*a* refers to the conversion function validation determination section 23*b* and makes the IP version conversion function valid or invalid.

The conversion function validation determination section 23*b* holds the instructions to make the IP version conversion function valid or invalid received from the terminal 54 by the IP version conversion setting communication section 26.

If the IP version conversion determination execution section 23*a* determines that it is necessary to make an IP version conversion, then the message conversion section 23*c* generates a message to be sent again to the SIP server 10 or 40. This message includes a new IP address which is acquired by the IP version conversion section 27 and by which the destination terminal can communicate with the source terminal and a new IP address which is acquired by the IP version conversion section 27 and by which the source terminal can communicate with the destination terminal.

The IP version table 23*d* stores the IP version which is implemented in the source terminal and which is included in the INVITE message sent first by the source terminal. As a result, the IP version conversion determination execution section 23*a* can compare the IP version which is implemented in the destination terminal and which is included in the response message sent from the SIP server 10 or from the SIP server 40, with the IP version which is implemented in the source terminal. The IP version table 23*d* is built in a storage unit, such as the RAM or the HDD.

The IP version conversion function management section 23*e* controls the IP version conversion section 27 at the request of the IP version conversion determination execution section 23*a*. To be concrete, the IP version conversion function management section 23*e* controls the acquisition and release of IPv4 and IPv6 addresses used for making an IP version conversion. The IP version conversion function management section 23*e* controls the generation and deletion of the IP version conversion table 28.

To return to descriptions of the call processing section 22 shown in FIG. 6, the call control section 24 controls the call on the basis of the SIP protocol. The SIP protocol control section 25 treats the SIP protocol.

The IP version conversion section 27 includes the IP version conversion table 28, an IP version conversion execution section 29, and an IP address management section 30.

The IP version conversion table 28 stores IPv4 and IPv6 addresses for connecting the source terminal in which IPv4 is implemented with the destination terminal in which IPv6 is implemented. The IP version conversion table 28 is built in a storage unit, such as the RAM or the HDD.

The IP version conversion execution section 29 refers to the IP version conversion table 28 and converts the IP address of an IPv4 or IPv6 frame.

The IP address management section 30 acquires and releases an IPv4 or IPv6 address stored in the IP version conversion table 28 in order to make an IP version conversion. The IP address management section 30 includes an IPv4 address management section 31 and an IPv6 address management section 32.

The IPv4 address management section 31 acquires and releases an IPv4 address stored in the IP version conversion table 28. The IPv6 address management section 32 acquires and releases an IPv6 address stored in the IP version conversion table 28.

An example other than that shown in FIG. 2 of the system configuration of the SIP servers will now be described.

Figure 8:
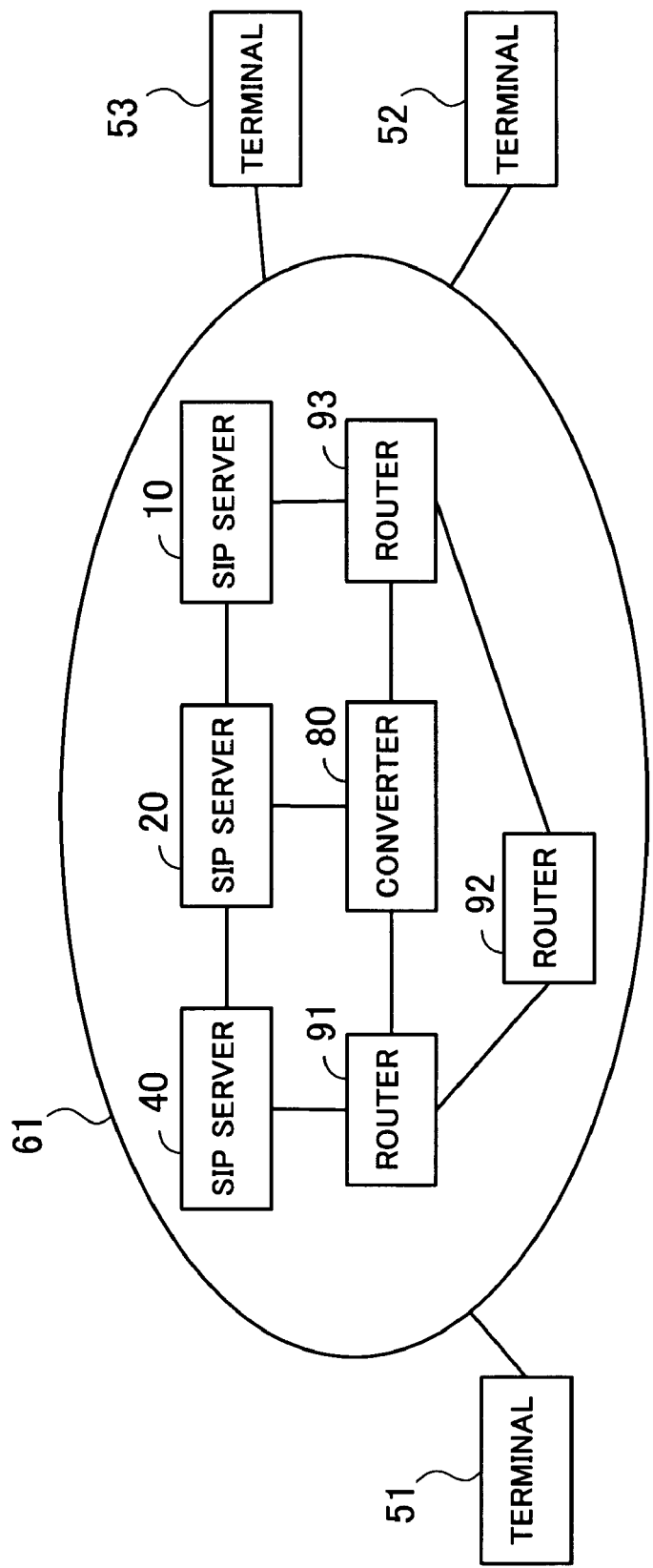
FIG. 8 is another example of the configuration of a SIP server system.

FIG. 8 is another example of the configuration of a SIP server system. In FIG. 8, the SIP servers 10, 20, and 40, the terminals 51 through 53, and the IP network 61 shown in FIG. 2 are shown. Routers 91 through 93 correspond to the core routers, edge routers, and the area routers, respectively, shown in FIG. 2. The other components shown in FIG. 2 is not shown in FIG. 8.

A converter 80 shown in FIG. 8 converts the address of a frame so that communication can be performed between the terminals 51 through 53 in which different IP versions are implemented. In FIGS. 2 and 6, the SIP server 20 includes the IP version conversion table 28 and converts the IP version of a frame. In FIG. 8, however, an IP version conversion function is separated from the SIP server 20 and the converter 80, being an independent device, carries out the IP version conversion function. That is to say, the IP version conversion function of the SIP server 20 shown in FIGS. 2 and 6 may be performed by another device (converter 80) located on the IP network 61. The SIP server 20 controls the converter 80 by communication via the IP network 61. In the following descriptions, it is assumed that the converter 80 includes the IP version conversion table 28.

An example of the data structure of the IP version conversion table 28 will now be described.

FIG. 9 shows an example of the data structure of the IP version conversion table. As shown in FIG. 9, the IP version conversion table 28 includes IPv4 Terminal Address, Intra-Converter IPv4 Address, Intra-Converter IPv6 Address, and IPv6 Terminal Address columns.

In the IPv4 Terminal Address column, the IP address of a terminal which is connected to the IP network 61 and in which IPv4 is implemented is stored. In the Intra-Converter IPv4 Address column, an IPv4 address assigned to a port of the converter 80 is stored. In the Intra-Converter IPv6 Address column, an IPv6 address assigned to a port of the converter 80 is stored. In the IPv6 Terminal Address column, the IP address of a terminal which is connected to the IP network 61 and in which IPv6 is implemented is stored. An address in each column is associated in a row direction.

Figure 10:
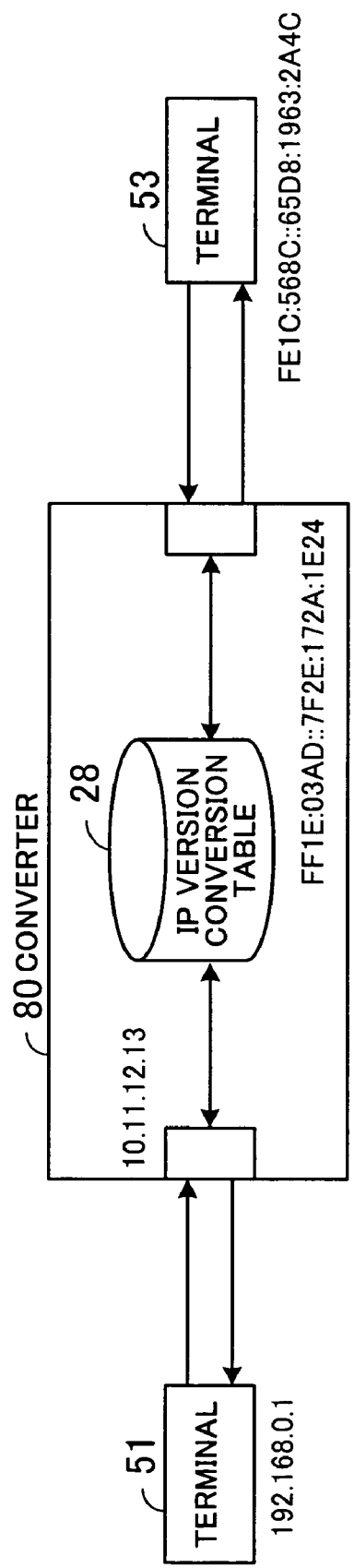
FIG. 10 is a view for describing an address conversion made by a converter.

FIG. 10 is a view for describing an address conversion made by the converter. In FIG. 10, the terminals 51 and 53 and the converter 80 including the IP version conversion table 28 are shown. It is assumed that IPv4 is implemented in the terminal 51 and that IPv6 is implemented in the terminal 53. It is assumed that IP addresses assigned to the terminal 51, ports of the converter 80, and the terminal 53 are indicated in the first row in the IP version conversion table 28 shown in FIG. 9.

When communication is performed from the terminal 51 to the terminal 53, the terminal 51 sends a frame to the IPv4 address "10.11.12.13" of the converter 80. The converter 80 converts the frame in the IPv4 format into a frame in the IPv6 format. To be concrete, the converter 80 refers to the IP version conversion table 28 and converts the frame in the IPv4 format into a frame in the IPv6 format in which destination and source addresses are "FE1C:568C::65D8:1963:2A4C" and "FF1E:03AD::7F2E:172A:1E24" respectively. As a result, even if IPv4 is implemented in the terminal 51, the terminal 53 can receive the frame.

When communication is performed from the terminal 53 to the terminal 51, the terminal 53 sends a frame to the IPv6 address "FF1E:03AD::7F2E:172A:1E24" of the converter 80. The converter 80 converts the frame in the IPv6 format into a frame in the IPv4 format. To be concrete, the converter 80 refers to the IP version conversion table 28 and converts the frame in the IPv6 format into a frame in the IPv4 format in which destination and source addresses are "192.168.0.1" and "10.11.12.13" respectively. As a result, even if IPv6 is implemented in the terminal 53, the terminal 51 can receive the frame.

Establishment of a session between terminals in which the same IP version is implemented will now be described.

Figure 11:
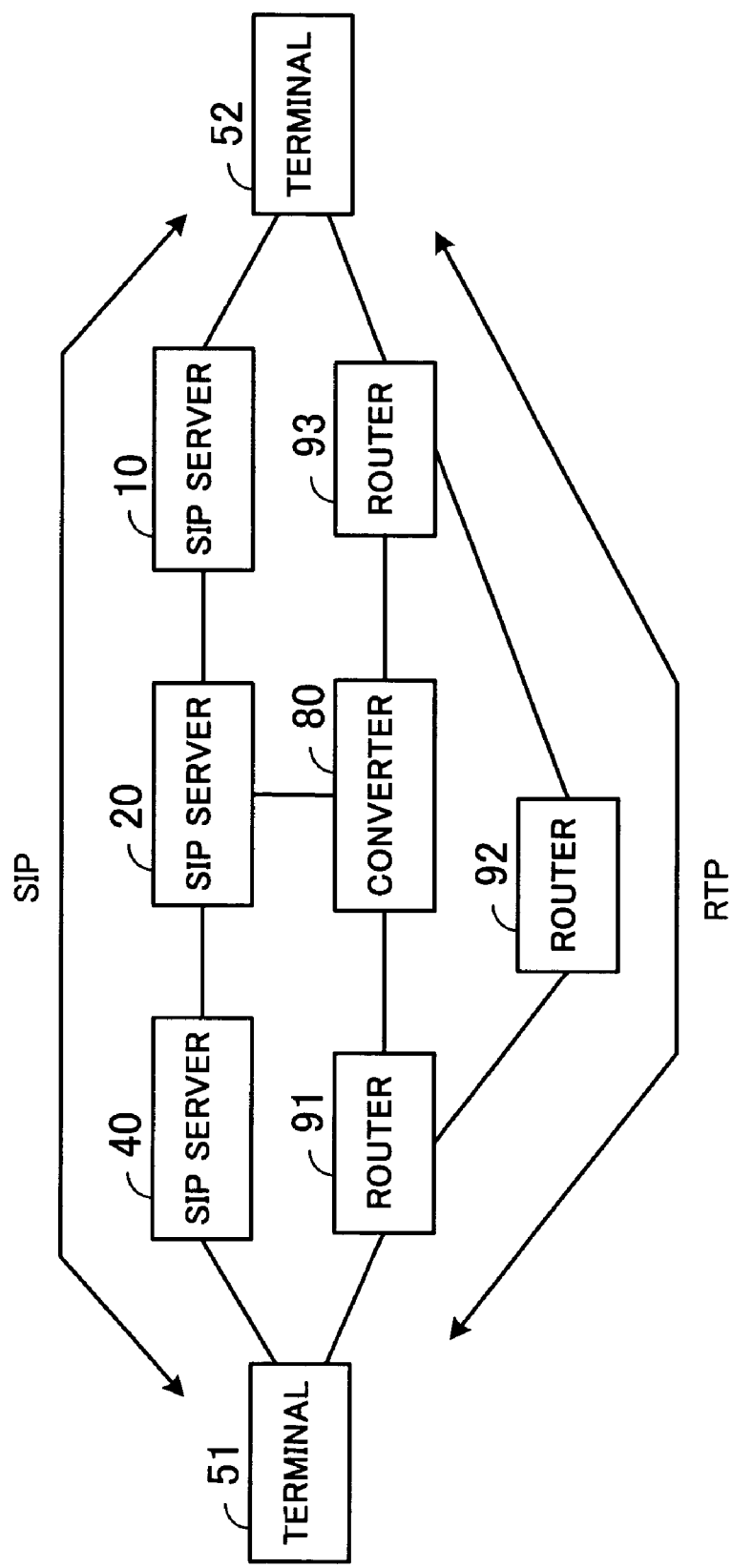
FIG. 11 shows an example of the configuration of a system in which a session is established between terminals in which the same IP version is implemented.

FIG. 11 shows an example of the configuration of a system in which a session is established between terminals in which the same IP version is implemented. In FIG. 11, the same components that are shown in FIG. 8 are marked with the same symbols, and descriptions of them will be omitted. In FIG. 11, the terminal 53 and the IP network 61 shown in FIG. 8 are not shown. It is assumed that IPv4 is implemented in the terminals 51 and 52.

Figure 12:
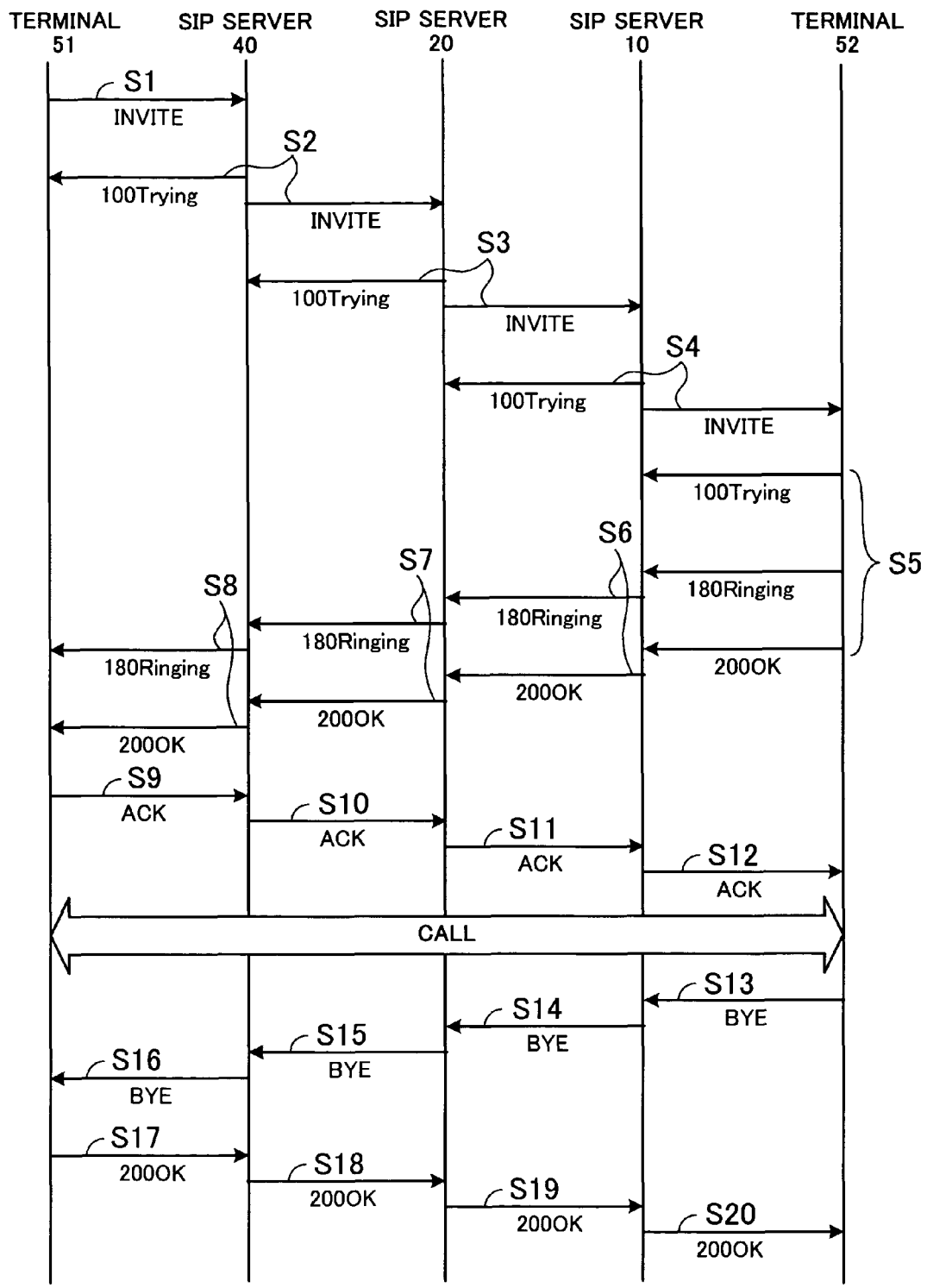
FIG. 12 is a sequence diagram of the system shown in FIG. 11.

FIG. 12 is a sequence diagram of the system shown in FIG. 11. The terminals 51 and 52 shown in FIG. 11 must establish a SIP session to communicate with each other. As shown in FIG. 12, in step S1 the terminal 51 sends an INVITE message to the SIP server 40. This INVITE message includes information which indicates that IPv4 is implemented in the terminal 51. A SIP message sent by the terminal 51 is set so that it will pass through the SIP server 20.

In step S2, the SIP server 40 receives the INVITE message sent from the terminal 51 and sends a 100Trying message to the terminal 51. The SIP server 40 sends the INVITE message it received from the terminal 51 to the SIP server 20.

In step S3, the SIP server 20 receives the INVITE message from the SIP server 40 and sends a 100Trying message to the SIP server 40. The SIP server 20 sends the INVITE message it received from the SIP server 40 to the SIP server 10.

In step S4, the SIP server 10 compares the IP version which is implemented in the terminal 51 and which is included in the INVITE message it received from the SIP server 20 with the IP version which is implemented in the terminal 52 and which is stored in the subscriber management table 16. The same IP version (IPv4) is implemented in the terminals 51 and 52. Accordingly, the SIP server 10 sends the SIP server 20 not a message to the effect that the IP versions implemented in the terminals 51 and 52 differ but a 100Trying message. The SIP server 10 also sends the INVITE message it received from the SIP server 20 to the terminal 52.

In step S5, the terminal 52 receives the INVITE message from the SIP server 10 and sends a 100Trying message to the SIP server 10. In addition, the terminal 52 sends a 180Ringing message and a 200OK message to the SIP server 10.

In step 56, the SIP server 10 receives the 180Ringing message and the 200OK message from the terminal 52 and sends the 180Ringing message and the 200OK message to the SIP server 20.

In step S7, the SIP server 20 receives the 180Ringing message and the 200OK message from the SIP server 10 and sends the 180Ringing message and the 200OK message to the SIP server 40.

In step S8, the SIP server 40 receives the 180Ringing message and the 200OK message from the SIP server 20 and sends the 180Ringing message and the 200OK message to the terminal 51.

In step S9, the terminal 51 receives the 180Ringing message and the 200OK message from the SIP server 40 and sends an ACK message to the SIP server 40.

In step S10, the SIP server 40 receives the ACK message from the terminal 51 and sends the ACK message to the SIP server 20.

In step S11, the SIP server 20 receives the ACK message from the SIP server 40 and sends the ACK message to the SIP server 10.

In step S12, the SIP server 10 receives the ACK message from the SIP server 20 and sends the ACK message to the terminal 52.

By exchanging the messages in this way, the terminals 51 and 52 establish a SIP session and establish an RTP session corresponding to a call path. As a result, the terminals 51 and 52 can communicate with each other.

In step S13, the terminal 52, for example, sends the SIP server 10 a BYE message to end the SIP session and the RTP session between the terminals 51 and 52.

In step S14, the SIP server 10 receives the BYE message from the terminal 52 and sends the BYE message to the SIP server 20.

In step S15, the SIP server 20 receives the BYE message from the SIP server 10 and sends the BYE message to the SIP server 40.

In step S16, the SIP server 40 receives the BYE message from the SIP server 20 and sends the BYE message to the terminal 51.

In step S17, the terminal 51 receives the BYE message from the SIP server 40 and sends a 200OK message to the SIP server 40.

In step S18, the SIP server 40 receives the 200OK message from the terminal 51 and sends the 200OK message to the SIP server 20.

In step S19, the SIP server 20 receives the 200OK message from the SIP server 40 and sends the 200OK message to the SIP server 10.

In step S20, the SIP server 10 receives the 200OK message from the SIP server 20 and sends the 200OK message to the terminal 52. As a result, the SIP session and the RTP session between the terminals 51 and 52 end.

As stated above, if the same IP version is implemented in the terminals 51 and 52, then the SIP server 10 does not send the SIP server 20 a message to the effect that the IP versions implemented in the terminals 51 and 52 differ. Accordingly, the SIP server 20 does not make the converter 80 generate the IP version conversion table 28 for the terminals 51 and 52. Moreover, the converter 80 does not make an IP version conversion. Therefore, as shown in FIG. 11, an RTP session via the converter 80 is not established.

Establishment of a session between terminals in which different IP versions are implemented will now be described.

Figure 13:
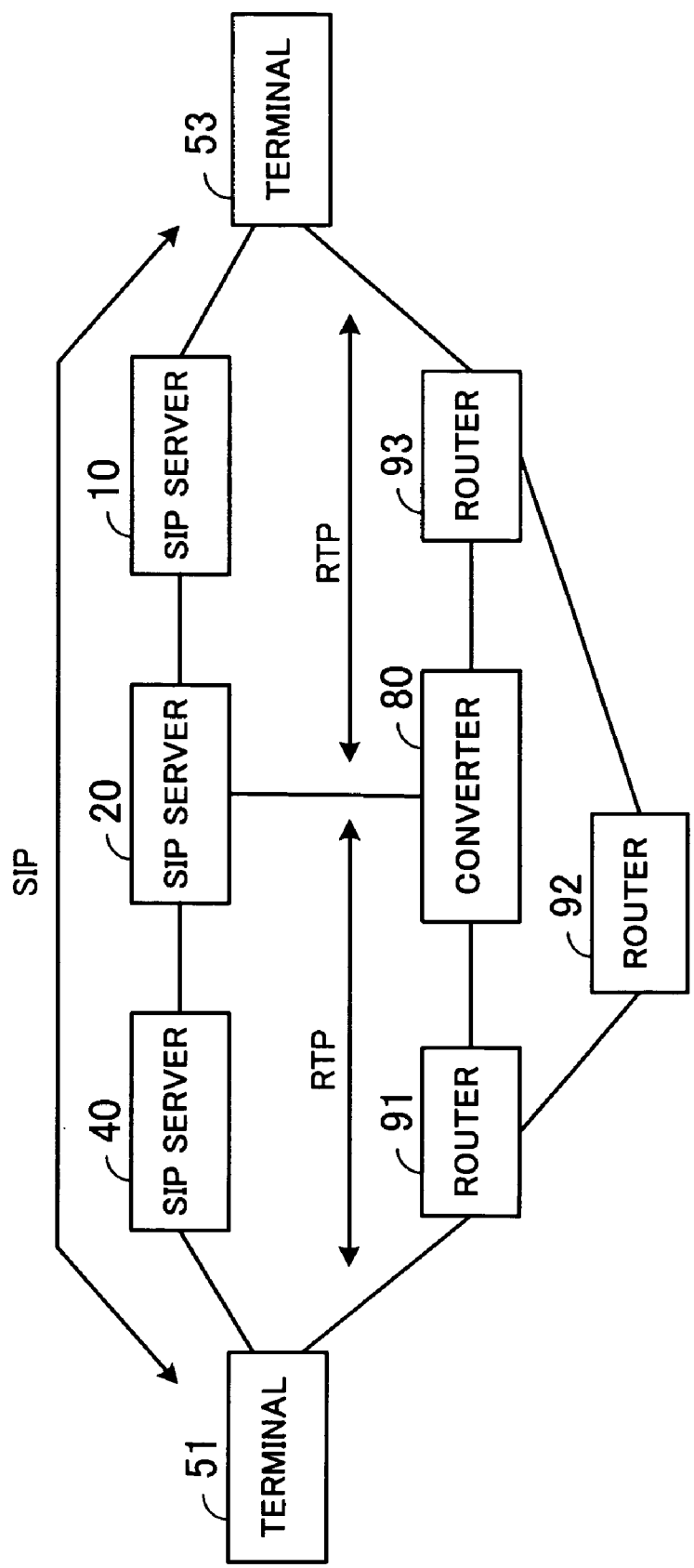
FIG. 13 shows an example of the configuration of a system in which a session is established between terminals in which different IP versions are implemented.

FIG. 13 shows an example of the configuration of a system in which a session is established between terminals in which different IP versions are implemented. In FIG. 13, the same components that are shown in FIG. 8 are marked with the same symbols, and descriptions of them will be omitted. In FIG. 13, the terminal 52 and the IP network 61 shown in FIG. 8 are not shown. It is assumed that IPv4 and IPv6 are implemented in the terminals 51 and 53 respectively.

Figure 14:
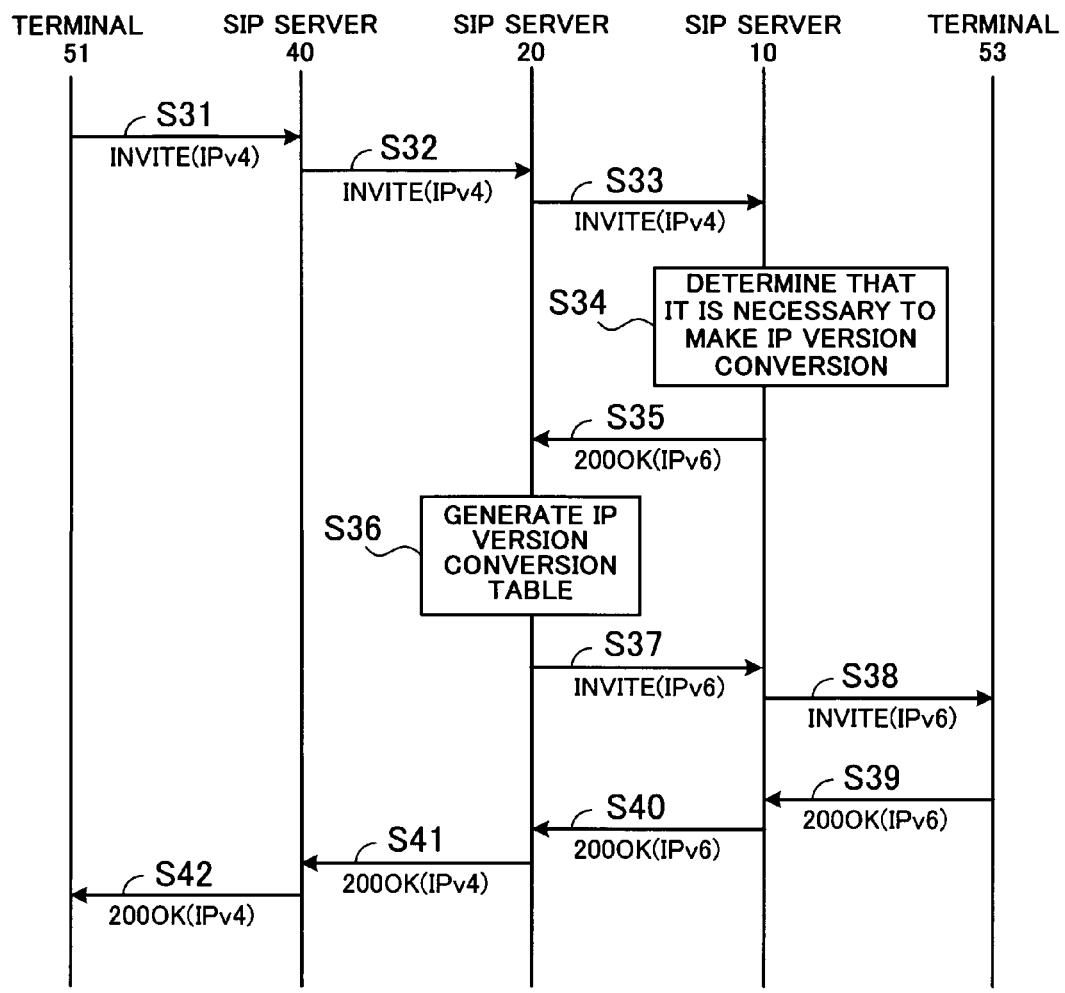
FIG. 14 is a sequence diagram of the system shown in FIG. 13.

FIG. 14 is a sequence diagram of the system shown in FIG. 13. The terminals 51 and 53 shown in FIG. 13 must establish a SIP session to communicate with each other. As shown in FIG. 14, in step S31 the terminal 51 sends an INVITE message to the SIP server 40. This INVITE message includes information which indicates that IPv4 is implemented in the terminal 51. In FIG. 14, 180Ringing messages and Ack messages are not shown. A SIP message sent by the terminal 51 is set so that it will pass through the SIP server 20.

In step S32, the SIP server 40 sends the INVITE message it received from the terminal 51 to the SIP server 20.

In step S33, the SIP server 20 stores the IP version which is implemented in the terminal 51 and which is included in the INVITE message it received from the SIP server 40 in the IP version table 23d. The SIP server 20 sends the SIP server 10 the INVITE message it received from the SIP server 40.

In step S34, the SIP server 10 acquires the IP version which is implemented in the terminal 53 and which is included in the INVITE message it received from the SIP server 20 from the subscriber management table 16. The SIP server 10 compares the IP version which is implemented in the terminal 53 and which it acquired with the IP version which is implemented in the terminal 51 and which is included in the INVITE message it received from the SIP server 20. IPv4 and IPv6 are implemented in the terminals 51 and 53 respectively, so these IP versions differ. As a result, the SIP server 10 determines that it is necessary to make an IP version conversion.

In step S35, as a result of the determination made in step S34, the SIP server 10 does not send the INVITE message to the terminal 53 but sends a 200OK message to the SIP server 20. The SIP server 10 describes the IP version implemented in the terminal 53 in this 200OK message.

In step S36, the SIP server 20 compares the IP version which is implemented in the terminal 51 and which is stored in the IP version table 23d in step S33 with the IP version which is implemented in the terminal 53 and which is included in the 200OK message it received from the SIP server 10. The IP versions implemented in the terminals 51 and 53 differ, so the SIP server 20 generates the IP version conversion table 28 so that the terminals 51 and 53 can communicate with each other.

In step S37, the SIP server 20 sends the SIP server 10 the INVITE message including an IPv6 address corresponding to the terminal 51 obtained by generating the IP version conversion table 28.

In step S38, the SIP server 10 sends the INVITE message it received from the SIP server 20 to the terminal 53.

In step S39, the terminal 53 receives the INVITE message from the SIP server 10 and sends a 200OK message to the SIP server 10.

In step S40, the SIP server 10 receives the 200OK message from the terminal 53 and sends the 200OK message to the SIP server 20.

In step S41, the SIP server 20 receives the 200OK message from the SIP server 10 and sends the 200OK message to the SIP server 40. At this time the SIP server 20 sends the SIP server 40 a 200OK message including an IPv4 address corresponding to the terminal 53 obtained by generating the IP version conversion table 28 in step S36.

In step S42, the SIP server 40 receives the 200OK message from the SIP server 20 and sends the 200OK message to the terminal 51.

As stated above, if the IP versions implemented in the terminals 51 and 53 differ, then the SIP server 10 determines that the IP versions implemented in the terminals 51 and 53 differ, and sends the SIP server 20 the 200OK message including IPv6 (the IP version implemented in the terminal 53). As a result, the SIP server 20 makes the converter 80 generate the IP version conversion table 28 for the terminals 51 and 53. Then the SIP server 20 sends the terminal 53 the IPv6 address corresponding to the terminal 51 obtained by generating the IP version conversion table 28 and sends the terminal 51 the IPv4 address corresponding to the terminal 53 obtained by generating the IP version conversion table 28. Each of the terminals 51 and 53 sends a frame to the IP address sent from the SIP server 20. As a result, the IP version of the frame is converted by the converter 80. Therefore, as shown in FIG. 13, an RTP session is established via the converter 80.

The generation of the IP version conversion table 28 performed in step S36 shown in FIG. 14 will now be described in detail.

Figure 15:
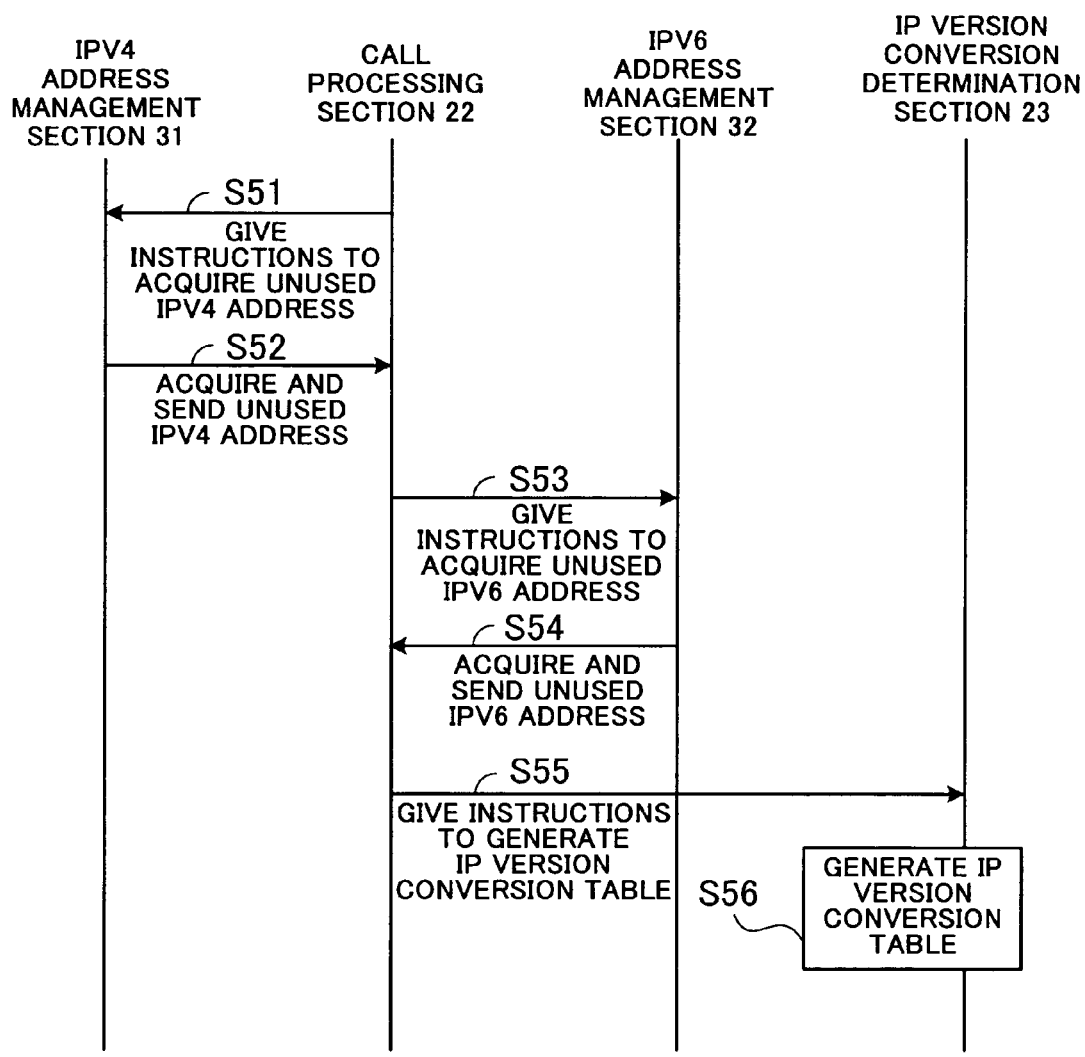
FIG. 15 is a sequence diagram of the generation of an IP version conversion table.

FIG. 15 is a sequence diagram of the generation of the IP version conversion table. In step S36 shown in FIG. 14, when the SIP server 20 determines that the IP versions implemented in the terminals 51 and 53 differ, the SIP server 20 generates the IP version conversion table 28 in accordance with the following steps.

In step S51, the call processing section 22 in the SIP server 20 gives the IPv4 address management section 31 instructions to acquire an unused IPv4 address.

In step S52, the IPv4 address management section 31 acquires an unused IPv4 address and sends the unused IPv4 address to the call processing section 22.

In step S53, the call processing section 22 gives the IPv6 address management section 32 instructions to acquire an unused IPv6 address.

In step S54, the IPv6 address management section 32 acquires an unused IPv6 address and sends the unused IPv6 address to the call processing section 22.

In step S55, the call processing section 22 sends the IP version conversion determination section 23 the IPv4 and IPv6 addresses acquired by the IPv4 address management section 31 and the IPv6 address management section 32 respectively. In addition, the call processing section 22 sends the IP version conversion determination section 23 the IP address of the terminal 51 included in the INVITE message sent to the SIP server 20 in step S32 shown in FIG. 14 and the IP address of the terminal 53 included in the 200OK message sent to the SIP server 20 in step S35 shown in FIG. 14 as instructions to generate an IP version conversion table.

In step S56, as shown in the IP version conversion table 28 in FIG. 9, the IP version conversion determination section 23 stores the acquired IPv4 and IPv6 addresses and the IP addresses of the terminals 51 and 53 sent thereto in step S55 in one row to associate them with one another.

The IP version conversion table 28 is generated in this way. As described in step S37 shown in FIG. 14, the acquired IPv6 address is included in the INVITE message sent to the SIP server 10. As described in step S41 shown in FIG. 14, the acquired IPv4 address is included in the 200OK message sent to the SIP server 40. Accordingly, when the terminal 51 sends a frame to the terminal 53, the terminal 51 should send it to the IPv4 address acquired by the SIP server 20. The frame sent from the terminal 51 is converted into an IPv6 frame by the IP version conversion table 28 included in the converter 80 and is sent to the terminal 53.

When a call between the terminals 51 and 53 ends, the acquired IPv4 and IPv6 addresses are released. The acquired addresses and the IP addresses of the terminals 51 and 53 stored in the IP version conversion table 28 are also released.

In the above-mentioned descriptions, the SIP server 20 generates the IP version conversion table 28 in step S36 in FIG. 14 in accordance with the sequence diagram shown in FIG. 15. However, the SIP server 20 may generate the IP version conversion table 28 after it receives the 200OK message sent in step S40. In this case, the IP address of the terminal 53 may be acquired not from the 200OK message sent in step S35 but from the 200OK message sent in step S40.

Each message will now be described. An INVITE message sent from the terminal 51 to the terminal 53 will be described first.

FIG. 16 shows an INVITE message. As shown in FIG. 16, an INVITE message includes a header field 101 for establishing a SIP session and a session description protocol (SDP) field 102 for establishing an RTP session. In the header field 101, the call ID "30017891@west.net" the terminal 51 uniquely has is described. In the lines o and c in the SDP field 102, the information "IP4" which indicates that an IP version implemented in the terminal 51 is IPv4 is described. In the line c, the IP address "192.168.0.1" of the terminal 51 is described. As shown in FIG. 14, this INVITE message is sent to the SIP server 20.

When the SIP server 20 receives the INVITE message, the SIP server 20 temporarily stores the call ID and the IP version included in the INVITE message in the IP version table 23d.

FIG. 17 shows an example of the data structure of the IP version table. As shown in FIG. 17, the IP version table 23d includes Call ID and IP Version columns. In the Call ID column, a call ID included in an INVITE message the SIP server 20 received from a source terminal is stored. In the IP Version column, an IP version included in an INVITE message the SIP server 20 received from a source terminal is stored. It is assumed that the SIP server 20 receives the INVITE message shown in FIG. 16. Then the SIP server 20 acquires "30017891@west.net" from the call ID in the INVITE message the SIP server 20 received and, as shown in FIG. 17, stores it in the IP version table 23d. In addition, the SIP server 20 acquires "IP4" indicative of the IP version implemented in the terminal 51 from the line c in the INVITE message, associates it with the call ID "30017891@west.net," and stores it in the IP version table 23d.

A REGISTER message will now be described. When a terminal falls under the control of the SIP server 10 or 40, the terminal sends a REGISTER message to the SIP server 10 or 40. The SIP server 10 or 40 acquires in advance information regarding the terminal by the REGISTER message.

FIG. 18 shows a REGISTER message. As shown in FIG. 18, a REGISTER message includes a source information field 103 and a contact field 104. In the source information field 103, a user name assigned to a terminal which generated the REGISTER message is described. In the contact field 104, an IP address assigned to a terminal is described. The REGISTER message shown in FIG. 18 is an example of a REGISTER message sent from the terminal 53 and includes the user name "UserJ@east.net" and the IP address "FE1C:568C::65D8:1963:2A4C".

When the SIP server 10 or 40 receives a REGISTER message from a terminal under its control, it acquires an IP version implemented in the terminal from the format of an address described in the contact field 104 of the REGISTER message. The SIP server 10 or 40 also acquires an IP address and a user name. The SIP server 10 or 40 stores the IP version, the user name, and the IP address it acquired in the subscriber management table 16.

FIG. 19 shows an example of the data structure of the subscriber management table. The subscriber management table 16 shown in FIG. 19 is included in the SIP server 10 and includes User Name, IP Version, and IP Address columns. In the User Name column, a user name which is assigned to a terminal and which is acquired from a REGISTER message is stored. In the IP Version column, an IP version which is implemented in a terminal and which is acquired from a REGISTER message is stored. In the IP Address column, the IP address of a terminal which is acquired from a REGISTER message is stored. It is assumed that the SIP server 10 receives the REGISTER message shown in FIG. 18 from the terminal 53. Then the SIP server 10 acquires the user name "UserJ@east.net," the IP version "IPv6," and the IP address "FE1C:568C::65D8:1963:2A4C" from the REGISTER message it received, associates them with one another, and stores them in the subscriber management table 16.

When the SIP server 10 receives the INVITE message shown in FIG. 16 from the terminal 51, the SIP server 10 recognizes from the lines o and c in the INVITE message it received that an IP version implemented in the terminal 51 is IPv4. In addition, the SIP server 10 recognizes from the header field 101 in the INVITE message it received that the INVITE message is sent to UserJ@east.net, refers to the subscriber management table 16, and acquires an IP version corresponding to the user name "UserJ@east.net". As can be seen from the example shown in FIG. 19, an IP version implemented in the terminal (53) to which the user name "UserJ@east.net" is assigned is IPv6. This means that the IP versions implemented in the terminals 51 and 53 differ. Therefore, the SIP server 10 determines that it is necessary to make an IP version conversion. On the basis of this determination, the SIP server 10 does not send the INVITE message to the terminal 53 and sends the SIP server 20 a 200OK message in which the IP version implemented in the terminal 53 and the IP address of the terminal 53 are described.

FIG. 20 shows a 200OK message sent from a SIP server which controls a terminal to a SIP server which makes an IP version conversion. As shown in FIG. 20, "IP6" which indicates that an IP version is IPv6 is described in the line o in an SDP field 105 in a 200OK message. "IP6" which indicates that an IP version is IPv6 and the IP address of the terminal 53 are described in the line c.

The SIP server 20 receives the 200OK message from the SIP server 10 and recognizes that IPv6 is implemented in the terminal 53. The SIP server 20 also recognizes from the IP version table 23d shown in FIG. 17 that IPv4 is implemented in the terminal 51. As a result, the SIP server 20 determines that it is necessary to make an IP version conversion.

As described in FIG. 15, the SIP server 20 acquires IPv4 and IPv6 addresses and generates the IP version conversion table 28 when the SIP server 20 determines that it is necessary to make an IP version conversion. The SIP server 20 changes the IP version and the IP address included in the INVITE message it sent before to the SIP server 10 to the IP version "IPv6" and the IPv6 address, respectively, it acquired, and sends the INVITE message again to the SIP server 10.

FIG. 21 shows the INVITE message sent again. As shown in FIG. 21, the SIP server 20 changes IP4's in the lines o and c in an SDP field 106 in the INVITE message to IP6's. In addition, the SIP server 20 changes the IP address in the line c to the IPv6 address it acquired. As described in step S37 shown in FIG. 14, the SIP server 20 sends the INVITE message shown in FIG. 21 to the SIP server 10 again.

The IP version included in the INVITE message sent to the SIP server 10 is IPv6. Accordingly, the SIP server 10 determines that it is unnecessary to make an IP version conversion, and sends the INVITE message to the terminal 53. The terminal 53 receives the INVITE message from the SIP server 10 and returns a 200OK message corresponding to the INVITE message to the SIP server 20 via the SIP server 10 as described in steps S39 and S40 shown in FIG. 14.

The SIP server 20 stores information which indicates that this 200OK message sent from the terminal 53 belongs to the SIP session during which the SIP server 20 determined that it is necessary to make an IP version conversion in, for example, the RAM or the HDD. Accordingly, the SIP server 20 changes the IP address included in the 200OK message it received to the IPv4 address it acquired at the time of generating the IP version conversion table 28, changes the IP version included in the 200OK message to IPv4 (IP4), and sends the 200OK message to the SIP server 40.

FIG. 22 shows the 200OK message in which the IP version and the IP address have been changed. As shown in FIG. 22, the SIP server 20 changes IP6's in the lines o and c in an SDP field 107 in the 200OK message to IP4's. In addition, the SIP server 20 changes the IP address in the line c to the IPv4 address it acquired. As described in steps S41 and S42 shown in FIG. 14, the SIP server 20 sends the 200Ok message shown in FIG. 22 to the terminal 51 via the SIP server 40.

As a result, an IPv4 RTP session is established between the terminal 51 and the converter 80 including the IP version conversion table 28 and an IPv6 RTP session is established between the terminal 53 and the converter 80. Therefore, the terminals 51 and 53 can communicate with each other via the converter 80.

The case where IPv4 and IPv6 are implemented in the source terminal and the destination terminal, respectively, has been described. However, even if IPv6 and IPv4 are implemented in the source terminal and the destination terminal respectively, communication can be performed between them in the same way that is described above.

The operation of the SIP server 20 will now be described by using a flow chart.

Figure 23:
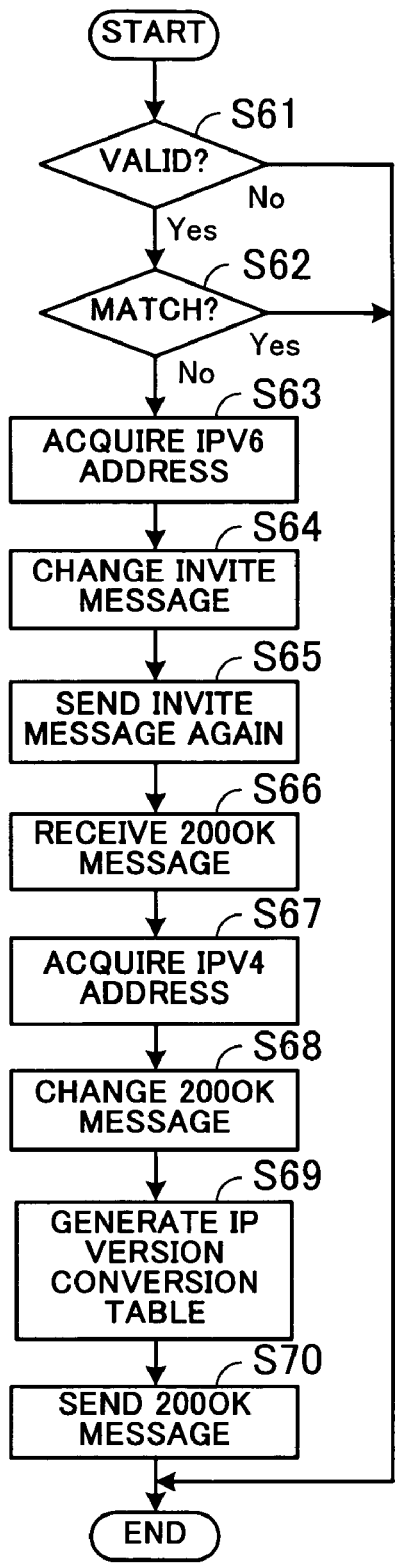
FIG. 23 is a flow chart showing the operation of a SIP server which generates the IP version conversion table.

FIG. 23 is a flow chart showing the operation of the SIP server which generates the IP version conversion table.

In step S61, the SIP server 20 determines whether or not the IP version conversion function has been made valid in accordance with instructions from the terminal 54. If the SIP server 20 determines that the IP version conversion function has been made valid, then step S62 is performed. If the SIP server 20 determines that the IP version conversion function has not been made valid, then the SIP server 20 does not generate the IP version conversion table 28 and the process terminates (the SIP server 20 does not make an IP version conversion but performs ordinary operation).

In step S62, the SIP server 20 determines whether an IP version which is implemented in a destination terminal (terminal 53) and which is included in a 200OK message it received from the SIP server 10 matches an IP version which is implemented in a source terminal (terminal 51) and which is stored in the IP version table 23d. If the SIP server 20 determines that these IP versions do not match, then step S63 is performed. If the SIP server 20 determines that these IP versions match, then the SIP server 20 does not generate the IP version conversion table 28 and the process terminates (the SIP server 20 does not make an IP version conversion but performs ordinary operation).

In step S63, the SIP server 20 acquires an unused IPv6 address corresponding to the terminal 51.

In step S64, the SIP server 20 changes IP4's in the lines o and c in an INVITE message it sent before to the SIP server 10 to IP6's and changes an address in the line c to the IPv6 address it acquired.

In step S65, the SIP server 20 sends the INVITE message it changed in step S64 to the SIP server 10 again.

In step S66, the SIP server 20 receives a 200OK message from the SIP server 10.

In step S67, the SIP server 20 acquires an unused IPv4 address corresponding to the terminal 53.

In step S68, the SIP server 20 changes IP6's in the lines o and c in the 200OK message to IP4's and changes an address in the line c to the IPv4 address it acquired.

In step S69, the SIP server 20 generates the IP version conversion table 28 by using the IPv4 and IPv6 addresses it acquired and the IP addresses of the terminals 51 and 53.

In step S70, the SIP server 20 sends the 200OK message it changed in step S68 to the SIP server 40.

As stated above, the SIP server 20 acquires the IPv4 and IPv6 addresses, generates the IP version conversion table 28, and enables communication between the terminals 51 and 53 in which the different IP versions are implemented.

On the flow chart shown in FIG. 23, after the SIP server 20 sends the INVITE message again to the SIP server 10 (step S65), the SIP server 20 receives the 200OK message, acquires the IPv4 address, and generates the IP version conversion table 28. As described in the sequence diagrams shown in FIGS. 14 and 15, however, the SIP server 20 may acquire the IPv4 address simultaneously with the IPv6 address to generate the IP version conversion table 28.

The operation of the SIP server 10 will now be described by using a flow chart.

Figure 24:
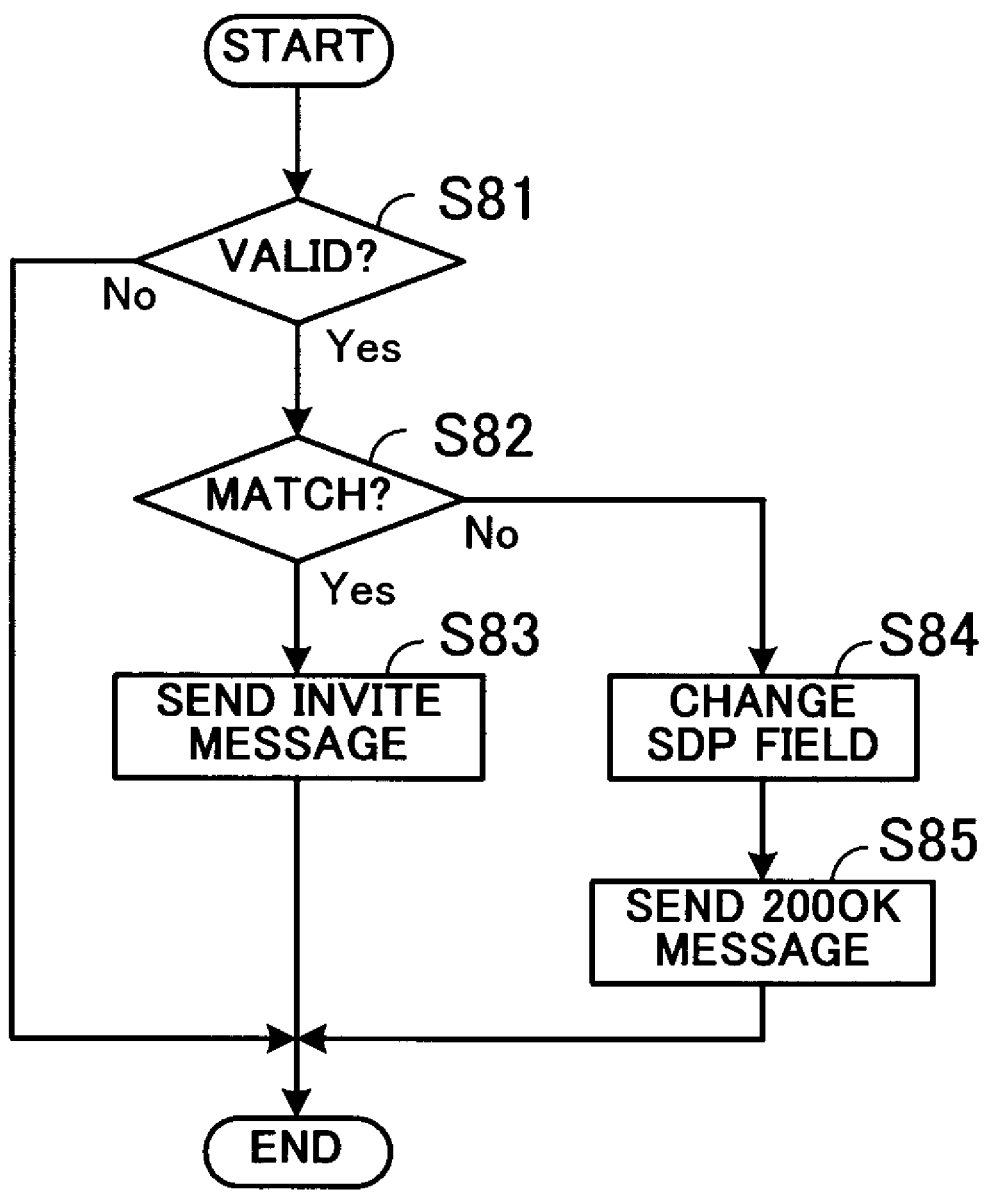
FIG. 24 is a flow chart showing the operation of a SIP server which determines whether it is necessary to make an IP version conversion.

FIG. 24 is a flow chart showing the operation of the SIP server which determines whether it is necessary to make an IP version conversion.

In step S81, the SIP server 10 determines whether or not the IP version conversion function has been made valid in accordance with instructions from the terminal 54. If the SIP server 10 determines that the IP version conversion function has been made valid, then step S82 is performed. If the SIP server 10 determines that the IP version conversion function has not been made valid, then the SIP server 10 does not determine whether it is necessary to make an IP version conversion, and the process terminates (the SIP server 10 does not make an IP version conversion but performs ordinary operation).

In step S82, the SIP server 10 determines whether an IP version which is implemented in a source terminal (terminal 51) and which is included in an INVITE message it received from the SIP server 20 matches an IP version which is implemented in a destination terminal (terminal 53) and which is stored in the subscriber management table 16. If the SIP server 10 determines that these IP versions do not match, then step S84 is performed. If the SIP server 10 determines that these IP versions match, then step S83 is performed.

In step S83, the SIP server 10 sends the INVITE message it received from the SIP server 20 to the terminal 53.

In step S84, the SIP server 10 changes the lines o and c in an SDP field in a 200OK message to information stored in the subscriber management table 16.

In step S85, the SIP server 10 sends the 200OK message changed in step S84 to the SIP server 20.

As stated above, the SIP server 10 determines whether it is necessary to convert the IP versions implemented in the source and destination terminals. If it is necessary to convert the IP versions implemented in the source and destination terminals, the SIP server 10 sends the SIP server 20 the 200OK message including the IP version implemented in the destination terminal.

Making an IP version conversion function valid and invalid will now be described.

Figure 25:
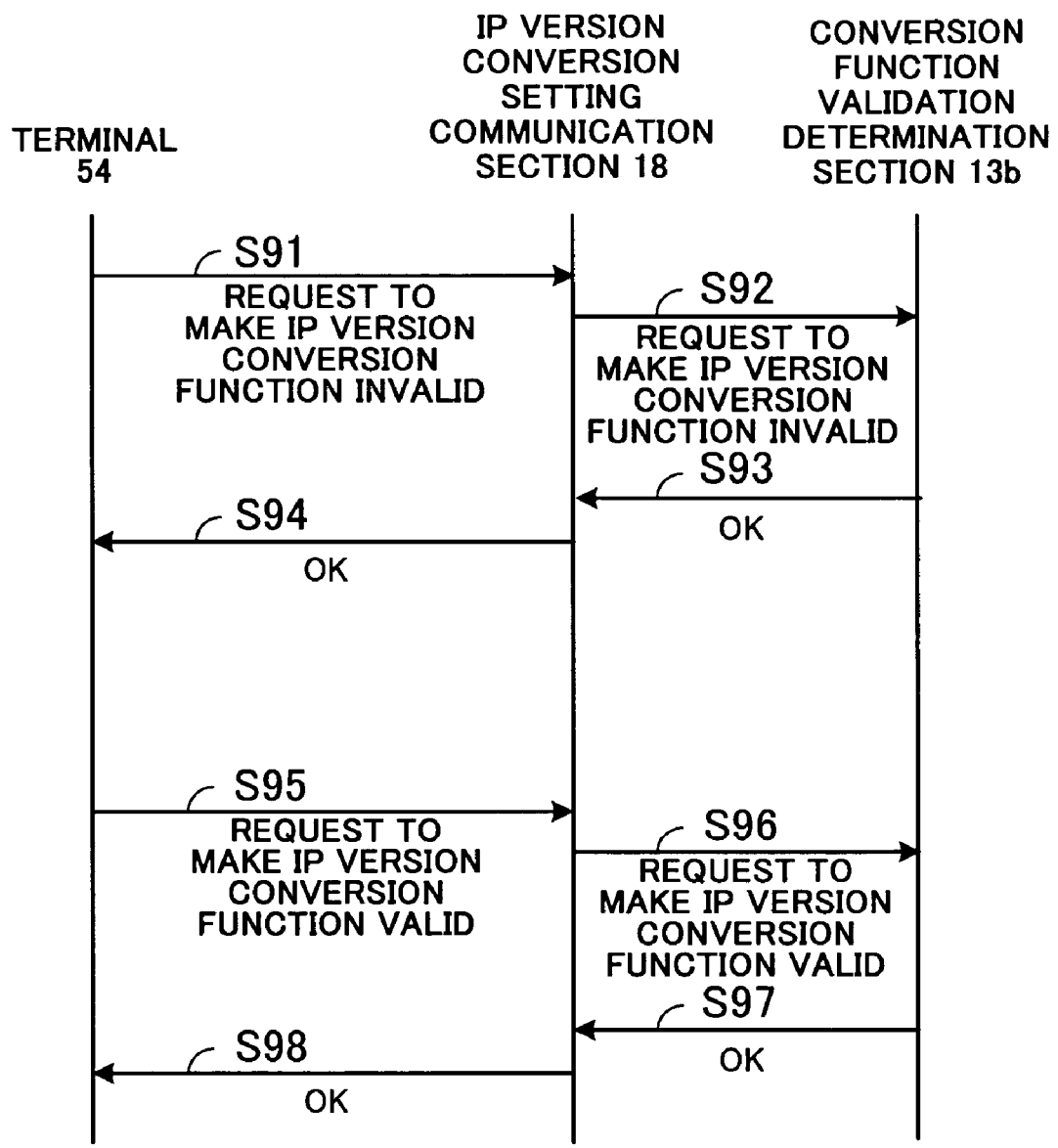
FIG. 25 is a sequence diagram showing the operation of setting the conversion function of a SIP server which determines whether it is necessary to make an IP version conversion.

FIG. 25 is a sequence diagram showing the operation of setting the conversion function of the SIP server which determines whether it is necessary to make an IP version conversion.

The IP version conversion function of the SIP server 10 is made invalid in the following way. In step S91, the terminal 54 sends the IP version conversion setting communication section 18 in the SIP server 10 a request to make the IP version conversion function of the SIP server 10 invalid.

In step S92, the IP version conversion setting communication section 18 in the SIP server 10 sends the conversion function validation determination section 13b the request to make the IP version conversion function of the SIP server 10 invalid it received from the terminal 54.

In step S93, the conversion function validation determination section 13b sends the IP version conversion setting communication section 18 an OK signal which indicates that it received the request to make the IP version conversion function of the SIP server 10 invalid.

In step S94, the IP version conversion setting communication section 18 sends the terminal 54 the OK signal it received from the conversion function validation determination section 13b. By receiving the OK signal from the IP version conversion setting communication section 18, the terminal 54 recognizes that the request to make the IP version conversion function of the SIP server 10 invalid was sent properly to the conversion function validation determination section 13b.

The IP version conversion function of the SIP server 10 is made valid in the following way. In step S95, the terminal 54 sends the IP version conversion setting communication section 18 in the SIP server 10 a request to make the IP version conversion function of the SIP server 10 valid.

In step S96, the IP version conversion setting communication section 18 in the SIP server 10 sends the conversion function validation determination section 13b the request to make the IP version conversion function of the SIP server 10 valid it received from the terminal 54.

In step S97, the conversion function validation determination section 13b sends the IP version conversion setting communication section 18 an OK signal which indicates that it received the request to make the IP version conversion function of the SIP server 10 valid.

In step S98, the IP version conversion setting communication section 18 sends the terminal 54 the OK signal it received from the conversion function validation determination section 13b. By receiving the OK signal from the IP version conversion setting communication section 18, the terminal 54 recognizes that the request to make the IP version conversion function of the SIP server 10 valid was sent properly to the conversion function validation determination section 13b.

The terminal 54 makes the IP version conversion function of the SIP server 10 valid on invalid in this way.

Figure 26:
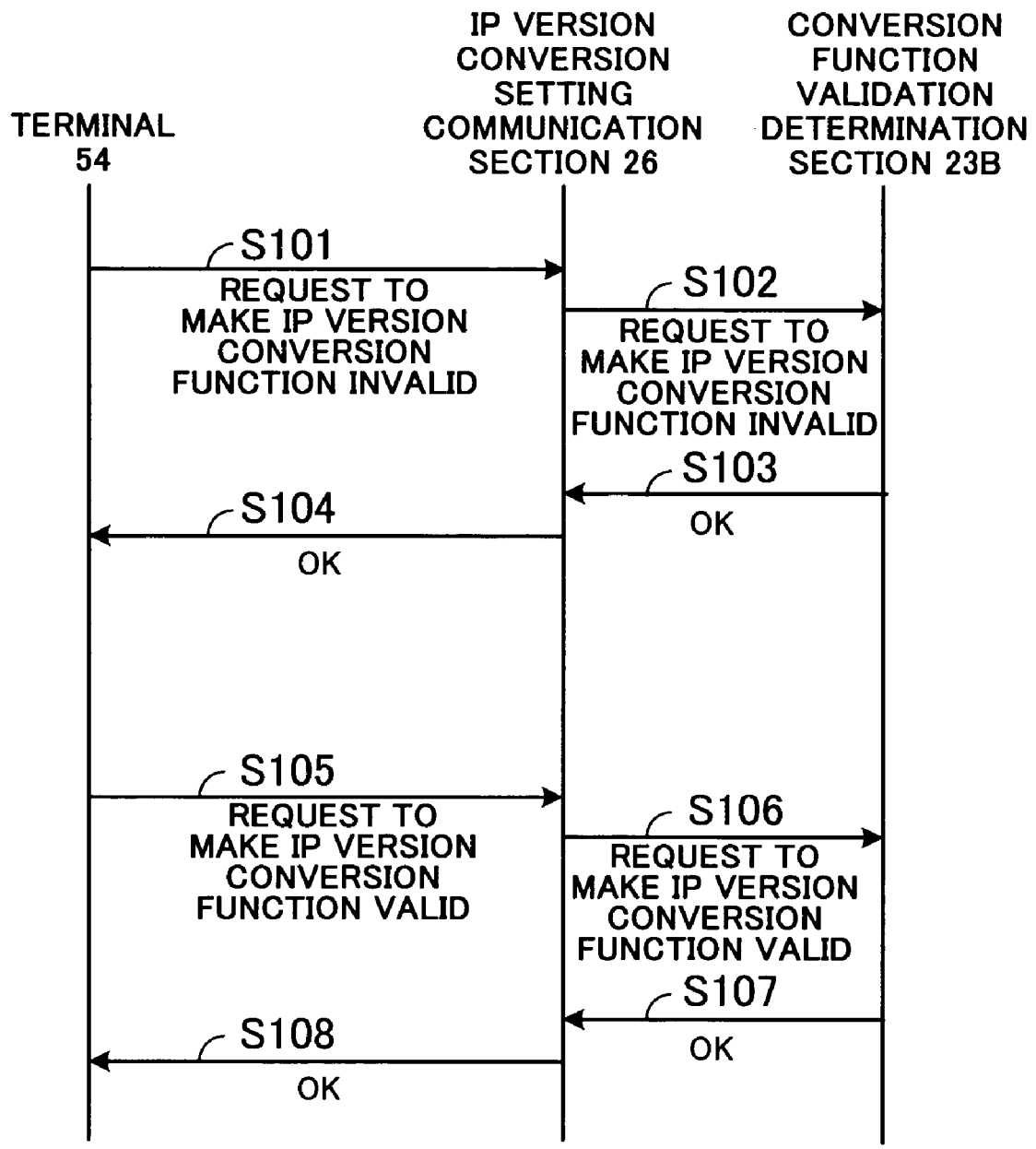
FIG. 26 is a sequence diagram showing the operation of setting the conversion function of a SIP server which generates the IP version conversion table.

FIG. 26 is a sequence diagram showing the operation of setting the conversion function of the SIP server which generates the IP version conversion table.

The IP version conversion function of the SIP server 20 is made invalid in the following way. In step S101, the terminal 54 sends the IP version conversion setting communication section 26 in the SIP server 20 a request to make the IP version conversion function of the SIP server 20 invalid.

In step S102, the IP version conversion setting communication section 26 in the SIP server 20 sends the conversion function validation determination section 23b the request to make the IP version conversion function of the SIP server 20 invalid it received from the terminal 54.

In step S103, the conversion function validation determination section 23b sends the IP version conversion setting communication section 26 an OK signal which indicates that it received the request to make the IP version conversion function of the SIP server 20 invalid.

In step S104, the IP version conversion setting communication section 26 sends the terminal 54 the OK signal it received from the conversion function validation determination section 23b. By receiving the OK signal from the IP version conversion setting communication section 26, the terminal 54 recognizes that the request to make the IP version conversion function of the SIP server 20 invalid was sent properly to the conversion function validation determination section 23b.

The IP version conversion function of the SIP server 20 is made valid in the following way. In step S105, the terminal 54 sends the IP version conversion setting communication section 26 in the SIP server 20 a request to make the IP version conversion function of the SIP server 20 valid.

In step S106, the IP version conversion setting communication section 26 in the SIP server 20 sends the conversion function validation determination section 23b the request to make the IP version conversion function of the SIP server 20 valid it received from the terminal 54.

In step S107, the conversion function validation determination section 23b sends the IP version conversion setting communication section 26 an OK signal which indicates that it received the request to make the IP version conversion function of the SIP server 20 valid.

In step S108, the IP version conversion setting communication section 26 sends the terminal 54 the OK signal it received from the conversion function validation determination section 23b. By receiving the OK signal from the IP version conversion setting communication section 26, the terminal 54 recognizes that the request to make the IP version conversion function of the SIP server 20 valid was sent properly to the conversion function validation determination section 23b.

The terminal 54 makes the IP version conversion function of the SIP server 20 valid on invalid in this way.

As described before, the SIP server which controls the destination terminal determines whether it is necessary to make an IP version conversion. As a result, the number of messages exchanged between the SIP server and the terminal can be reduced and therefore time taken to establish a SIP session can be shortened. Moreover, the terminal does not need the function of determining whether IP versions match. This reduces the manufacturing costs of terminals.

As can be seen from the sequence diagrams shown in FIGS. 25 and 26, a provider who provides SIP servers can set a SIP server having an IP version conversion function and a SIP server not having an IP version conversion function by giving instructions from a terminal. Therefore, the provider can easily provide users with a SIP server having an IP version conversion function or a SIP server not having an IP version conversion function.

A SIP server system according to a second embodiment of the present invention will now be described in detail with reference to the drawings. In the SIP server system according to the first embodiment of the present invention, the SIP server 10 determines whether it is necessary to make an IP version conversion. If it is necessary to make an IP version conversion, the SIP server 10 sends the SIP server 20 a 200OK message including the IP version implemented in the destination terminal and the IP address of the destination terminal. In the SIP server system according to the second embodiment of the present invention, the SIP server 10 sends the SIP server 20 not a 200OK message but a new status message which indicates that it is necessary to make an IP version conversion. The SIP server 20 receives this status message and generates an IP version conversion table. The SIP server system according to the second embodiment of the present invention differs from the SIP server system according to the first embodiment of the present invention only in this respect. Accordingly, functional block diagrams and system configuration diagrams of the SIP server system according to the second embodiment of the present invention are the same as those of the SIP server system according to the first embodiment of the present invention.

Figure 27:
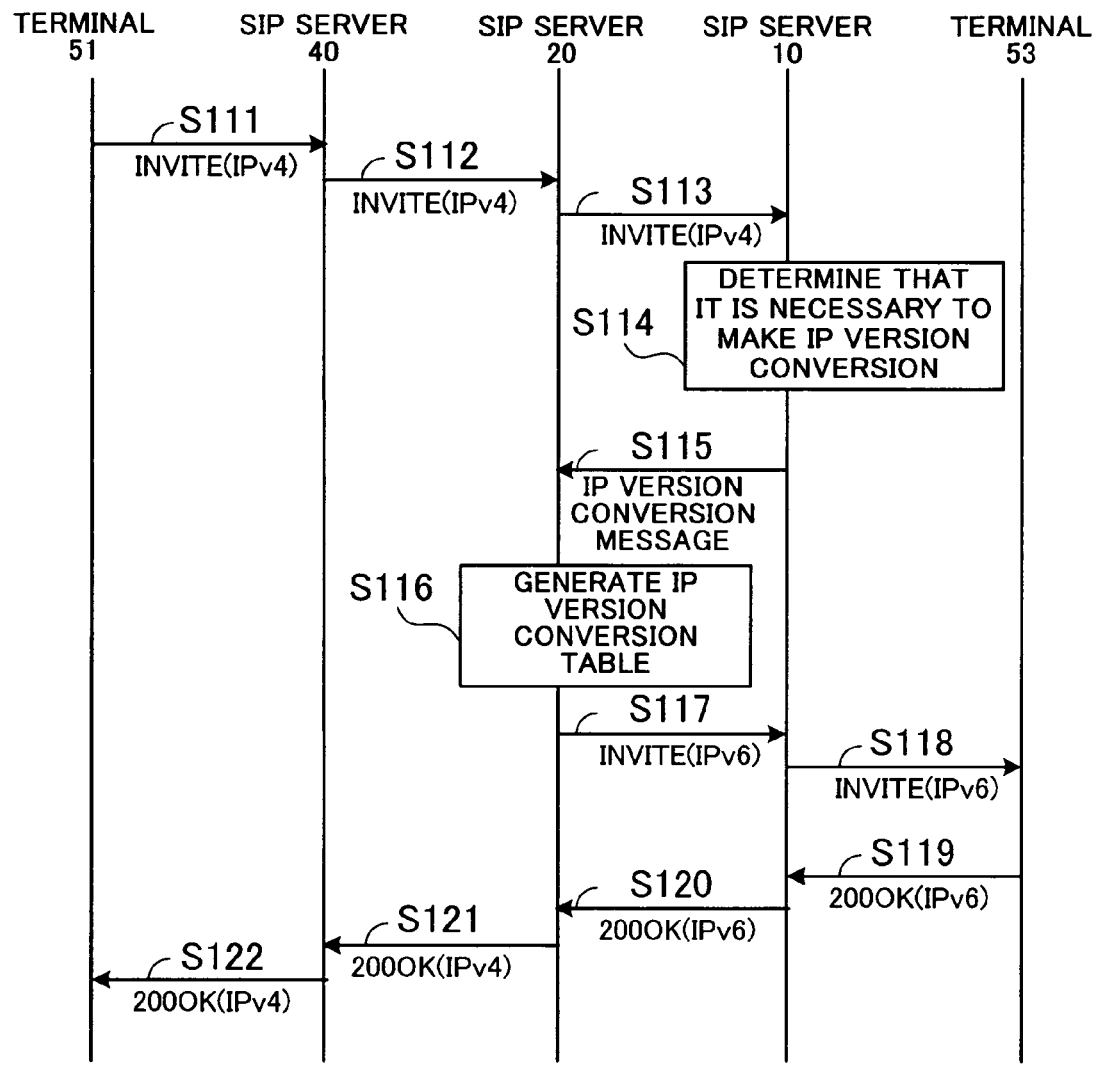
FIG. 27 is a sequence diagram showing the operation of establishing a session between terminals in which different IP versions are implemented in a SIP server system according to a second embodiment of the present invention.
Figure 29:
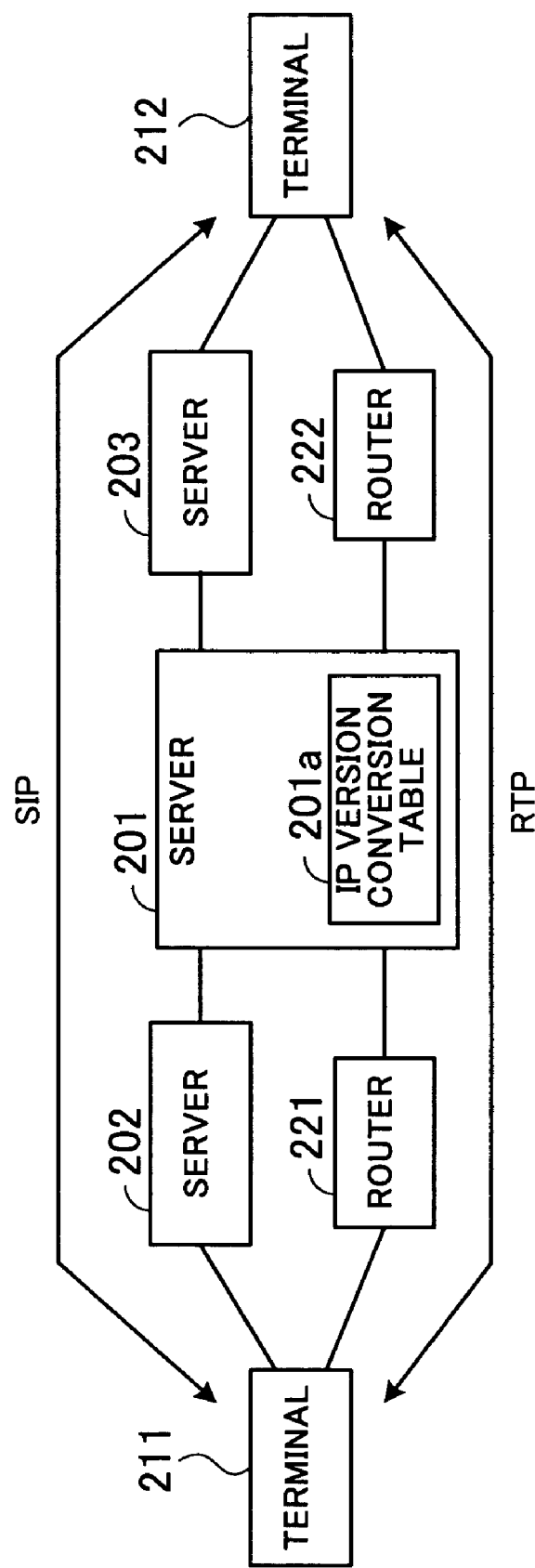
FIG. 29 shows an example of the configuration of a conventional SIP server system.
Figure 30:
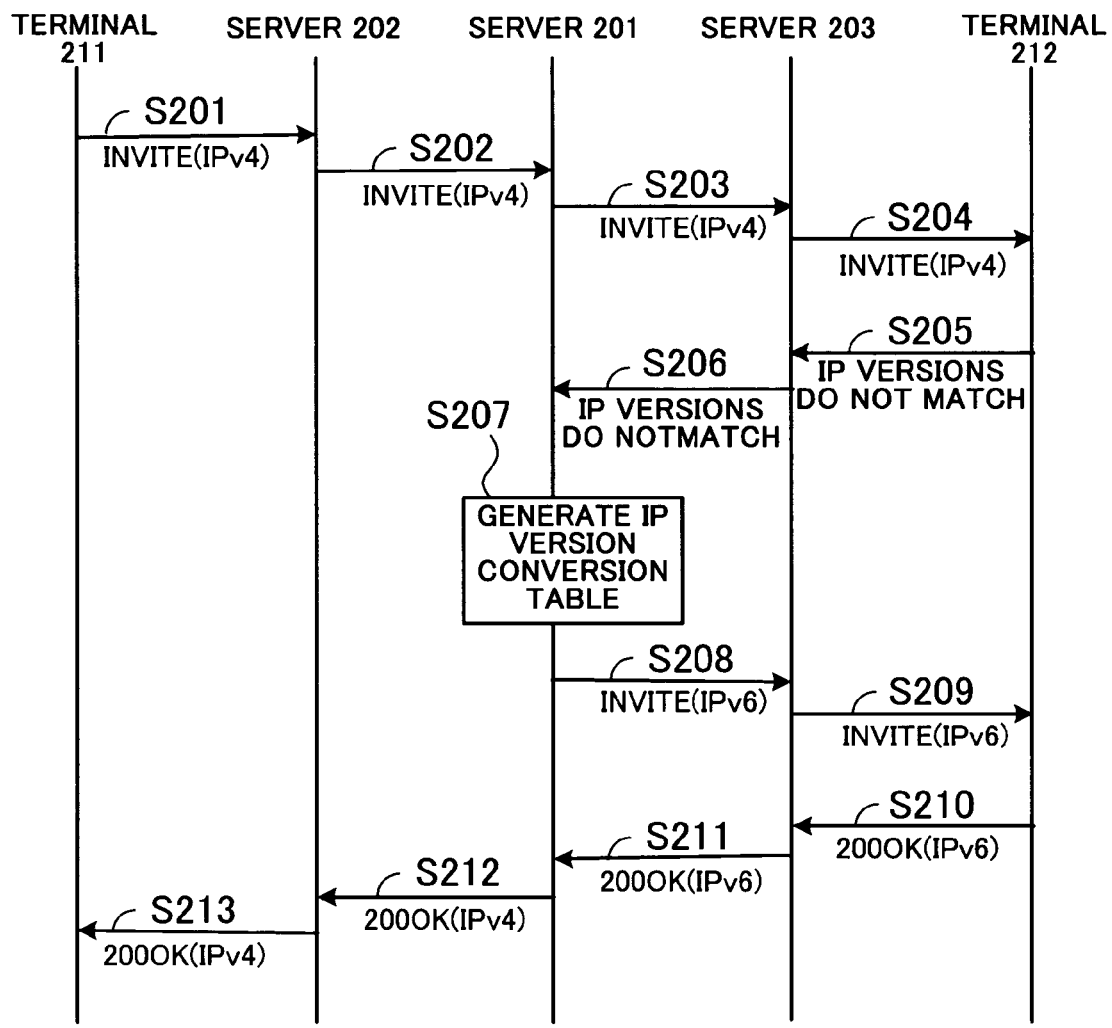
FIG. 30 is a sequence diagram of the system shown in FIG. 29.
Figure 31:
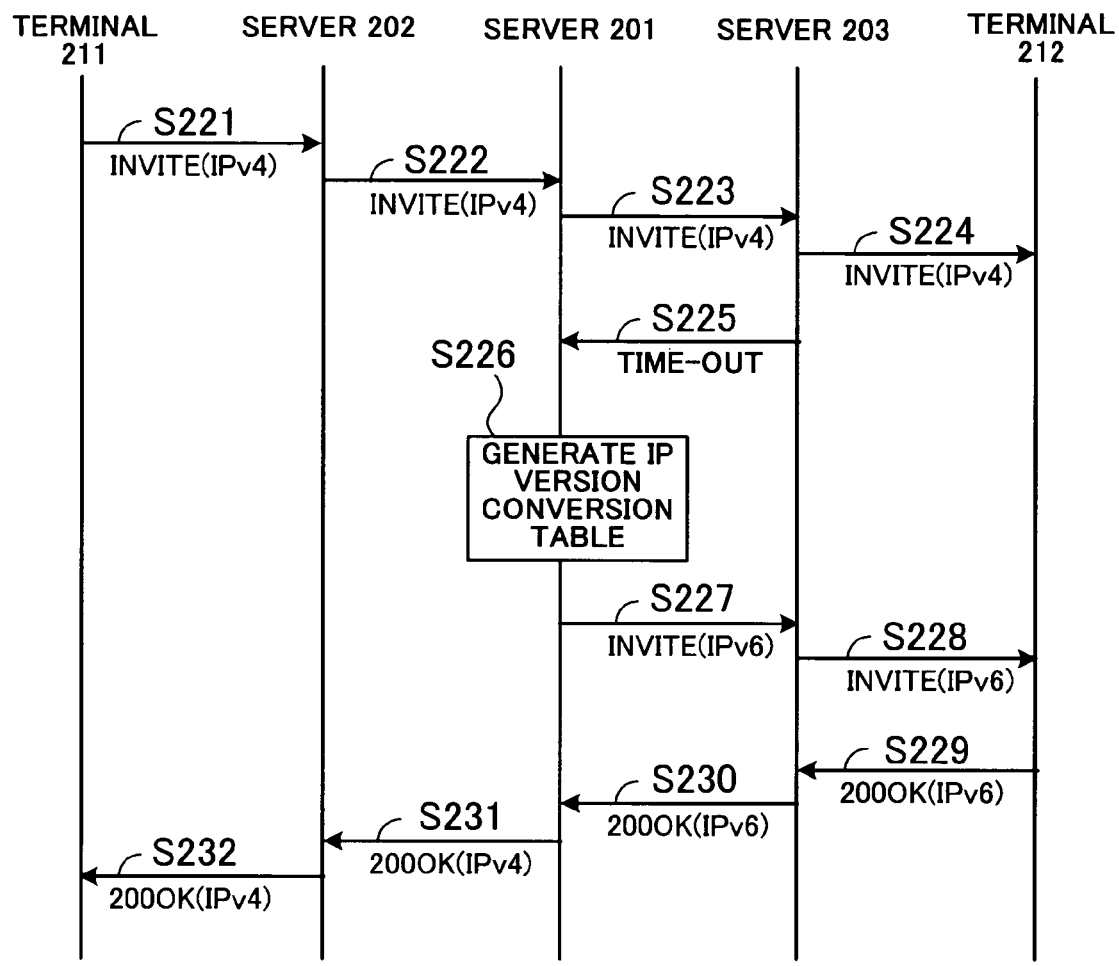
FIG. 31 is another sequence diagram of the system shown in FIG. 29.

FIG. 27 is a sequence diagram showing the operation of establishing a session between terminals in which different IP versions are implemented in a SIP server system according to a second embodiment of the present invention. The sequence diagram shown in FIG. 27 corresponds to the system configuration shown in FIG. 13.

The terminals 51 and 53 shown in FIG. 13 must establish a SIP session to communicate with each other. As shown in FIG. 27, in step S111 the terminal 51 sends an INVITE message to the SIP server 40. This INVITE message includes information which indicates that IPv4 is implemented in the terminal 51. In FIG. 27, 180Ringing messages and Ack messages are not shown. A SIP message sent by the terminal 51 is set so that it will pass through the SIP server 20.

In step S112, the SIP server 40 sends the INVITE message it received from the terminal 51 to the SIP server 20.

In step S113, the SIP server 20 stores the IP version which is implemented in the terminal 51 and which is included in the INVITE message it received from the SIP server 40 in the IP version table 23d. The SIP server 20 sends the SIP server 10 the INVITE message it received from the SIP server 40.

In step S114, the SIP server 10 acquires an IP version which is implemented in the destination terminal (terminal 53) and which is included in the INVITE message it received from the SIP server 20 from the subscriber management table 16. The SIP server 10 compares the IP version which is implemented in the terminal 53 and which it acquired with the IP version which is implemented in the terminal 51 and which is included in the INVITE message it received from the SIP server 20. IPv4 and IPv6 are implemented in the terminals 51 and 53 respectively, so these IP versions differ. As a result, the SIP server 10 determines that it is necessary to make an IP version conversion.

In step S115, as a result of the determination made in step S114, the SIP server 10 does not send the INVITE message to the terminal 53 but sends an IP version conversion message to the SIP server 20. For example, an unused response code 399 prescribed for a SIP session is used as the IP version conversion message.

In step S116, the SIP server 20 receives the IP version conversion message from the SIP server 10 and generates the IP version conversion table 28.

In step S117, the SIP server 20 sends the SIP server 10 the INVITE message including an IPv6 address corresponding to the terminal 51 obtained by generating the IP version conversion table 28.

In step S118, the SIP server 10 sends the INVITE message it received from the SIP server 20 to the terminal 53.

In step S119, the terminal 53 receives the INVITE message from the SIP server 10 and sends a 200OK message to the SIP server 10.

In step S120, the SIP server 10 receives the 200OK message from the terminal 53 and sends the 200OK message to the SIP server 20.

In step S121, the SIP server 20 receives the 200OK message from the SIP server 10 and sends the 200OK message to the SIP server 40. At this time the SIP server 20 sends the SIP server 40 a 200OK message including an IPv4 address corresponding to the terminal 53 obtained by generating the IP version conversion table 28 in step S116.

In step S122, the SIP server 40 receives the 200OK message from the SIP server 20 and sends the 200OK message to the terminal 51.

The IP version conversion message will now be described.

FIG. 28 shows an example of the IP version conversion message. For example, an unused response code 399 prescribed for a SIP session is used as a 399 IP Kind Unmatched message with an underline 108 shown in FIG. 28. This message is the IP version conversion message. The SIP server 20 receives the 399 IP Kind Unmatched message and generates the IP version conversion table 28.

As stated above, the IP version conversion table 28 can be generated not by using a 200OK message, but by using a dedicated message which indicates that it is necessary to make an IP version conversion. In this case, there is no need for the SIP server 20 to refer to the IP version table 23d and compare IP versions (the SIP server 20 must perform this operation in, for example, step S36 shown in FIG. 14). Therefore, A session can be established more quickly.

With the server according to the present invention, an IP version implemented in a source terminal is compared with an IP version implemented in a destination terminal the server controls. The result of the comparison is sent to the address converter which makes an address conversion so that the IP versions of data frames exchanged between the source and destination terminals will match. As a result, there is no need for the destination terminal to determine whether the IP versions match, and the number of messages exchanged between the destination terminal and the server reduces. Therefore, time taken to establish a session can be shortened and the manufacturing costs of terminals can be reduced.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A server connected to an IP network, the server comprising:
    an IP version storage section which stores an IP version implemented in a destination terminal under the control of the server;
    a message receiving section for receiving a message for establishing a session between a source terminal and the destination terminal from the source terminal;
    an IP version acquisition section for acquiring the IP version implemented in the destination terminal corresponding to the message from the IP version storage section;
    an IP version comparison section for comparing an IP version which is implemented in the source terminal and which is included in the message with the IP version which is implemented in the destination terminal and which is acquired by the IP version acquisition section; and
    a comparison result sending section for sending a result of the comparison by the IP version comparison section to an address converter which makes an address conversion so that IP versions of data frames exchanged between the source terminal and the destination terminal will match, wherein the comparison result sending section uses an unused response code prescribed for a SIP session as a response message which indicates that the IP versions differ as the result of the comparison.

2. The server according to claim 1, wherein the IP version comparison section makes the comparison in accordance with instructions from an instruction terminal connected to the IP network.

3. The server according to claim 1, further comprising an IP version receiving section for receiving, at the time of the destination terminal being connected to the IP network, the IP version implemented in the destination terminal and for storing the IP version implemented in the destination terminal in the IP version storage section.

4. The server according to claim 1, wherein the address converter stores addresses used for converting addresses of the data frames in a converter connected to the IP network.

5. A method for controlling communication with a server connected to an IP network, the method comprising the steps of:
    receiving a message for establishing a session between a source terminal and a destination terminal from the source terminal;
    acquiring an IP version implemented in the destination terminal corresponding to the message from an IP version storage unit which stores the IP version implemented in the destination terminal under the control of the server;
    comparing an IP version which is implemented in the source terminal and which is included in the message with the IP version which is implemented in the destination terminal and which is acquired from the IP version storage unit; and
    sending a result of the comparison of the IP versions to an address converter which makes an address conversion so that IP versions of data frames exchanged between the source terminal and the destination terminal will match, wherein an unused response code prescribed for a SIP session is used as a response message which indicates that the IP versions differ as the result of the comparison.

6. A communication system for controlling communication between terminals connected to an IP network, the system comprising:
    an IP version determination server including:
        an IP version storage section which stores an IP version implemented in a destination terminal under the control of the IP version determination server,
        a message receiving section for receiving a message for establishing a session between a source terminal and the destination terminal from the source terminal,
        an IP version acquisition section for acquiring the IP version implemented in the destination terminal corresponding to the message from the IP version storage section,
        an IP version comparison section for comparing an IP version which is implemented in the source terminal and which is included in the message with the IP version which is implemented in the destination terminal and which is acquired by the IP version acquisition section, and
        a comparison result sending section for sending an unused response code prescribed for a SIP session as a response message indicating that the IP versions differ as a result of the comparison by the IP version comparison section; and
    an IP version conversion server including:
        a message sending section for receiving the message from the source terminal and for sending the message to the IP version determination server,
        a response code receiving section for receiving the response code from the IP version determination server, and
        a conversion table generation section for generating an address conversion table for making an address conversion in response to receipt of the response code so that IP versions of data frames exchanged between the source terminal and the destination terminal will match.

7. A communication control method for controlling communication between terminals connected to an IP network, the method comprising the steps of:
    receiving, by an IP version determination server, a message for establishing a session between a source terminal and a destination terminal from the source terminal;
    acquiring an IP version implemented in the destination terminal corresponding to the message from an IP version storage unit which stores the IP version implemented in the destination terminal under the control of the IP version determination server;

comparing, by the IP version determination server, an IP version which is implemented in the source terminal and which is included in the message with the IP version which is implemented in the destination terminal and which is acquired from the IP version storage unit;

sending an unused response code prescribed for a SIP session as a response message indicating that the IP versions differ as a result of the comparison of the IP versions by the IP version determination server;

receiving the response code by an IP version conversion server; and generating, by the IP version conversion server, an address conversion table for making an address conversion in response to receipt of the response code so that IP versions of data frames exchanged between the source terminal and the destination terminal will match.

8. A server connected to an IP network, the server comprising:

a message sending section for receiving a message for establishing a session between a source terminal and a destination terminal from the source terminal, and for sending the message to a control server which controls the destination terminal;

an IP version information receiving section for receiving information indicating that the source terminal and the destination terminal have different IP versions, from the control server by means of an unused response code prescribed for a SIP session;

a conversion table generation section for generating an address conversion table for making an address conversion in response to receipt of the information so that IP versions of data frames exchanged between the source terminal and the destination terminal will match; and a generation instruction section for giving, in accordance with instructions from an instruction terminal connected to the IP network, the conversion table generation section instructions to generate the address conversion table.

* * * * *